(12) United States Patent
Kallas et al.

(10) Patent No.: US 9,435,497 B2
(45) Date of Patent: Sep. 6, 2016

(54) LIGHTING DEVICE AND SYSTEM FOR WIRELESS CALIBRATION AND CONTROLLING OF LIGHTING DEVICE

(71) Applicant: Digital Sputnik Lighting OÜ, Tallinn (EE)

(72) Inventors: Kaspar Kallas, Harjumaa (EE); Tõnu Kallas, Harjumaa (EE); Kaur Kallas, Harjumaa (EE); Eduard Vaselo, Tallinn (EE)

(73) Assignee: Digital Sputnik Lighting OÜ, Tallinn (EE)

( * ) Notice: Subject to any disclaimer, the term of this patent is extended or adjusted under 35 U.S.C. 154(b) by 0 days.

(21) Appl. No.: 14/779,561

(22) PCT Filed: Apr. 2, 2014

(86) PCT No.: PCT/EE2014/000002
§ 371 (c)(1),
(2) Date: Oct. 2, 2015

(87) PCT Pub. No.: WO2014/161554
PCT Pub. Date: Oct. 9, 2014

(65) Prior Publication Data
US 2016/0040837 A1    Feb. 11, 2016

(30) Foreign Application Priority Data

Apr. 5, 2013  (EE) .................................. 1300036 U
Mar. 28, 2014 (EE) .................................. 1400017 U

(51) Int. Cl.
*F21S 2/00*     (2016.01)
*F21V 29/83*    (2015.01)
(Continued)

(52) U.S. Cl.
CPC ................ *F21S 2/005* (2013.01); *F21V 29/02* (2013.01); *F21V 29/508* (2015.01); *F21V 29/83* (2015.01);
(Continued)

(58) Field of Classification Search
CPC .... F21S 2/005; H05B 33/086; F21V 29/508; F21V 29/83; F21V 29/02; G01J 3/28; G01J 3/10; F21W 2131/406; F21Y 2101/02; F21Y 2105/001
See application file for complete search history.

(56) References Cited

U.S. PATENT DOCUMENTS 8,233,785 B1    7/2012  Surma
8,330,387 B2 *  12/2012 York ........................ F21K 9/54
                                                    315/112

(Continued)

FOREIGN PATENT DOCUMENTS

EP       1528380 A1     5/2005
EP       2025999 A2     2/2009
WO    2011127481 A3     3/2012

*Primary Examiner* — Crystal L Hammond
(74) *Attorney, Agent, or Firm* — Steinberg Intellectual Property Law LLC; Gloria M. Steinberg

(57) ABSTRACT

Present invention relates to modular lighting devices and systems as may be used for film, television and photography. Semiconductor technology based lighting device is mobile and miniature by its dimensions. Device consists of lighting modules, that may be grouped together, power supply and control module and a controller unit, that enables to use light sources of different colors and temperatures. Housing includes a parabolic curve shaped element located under the active cooler to improve the efficiency of the active cooling by re-directing the cooling stream under an angle. The system for wireless calibration and controlling of lighting device provides software functionality to a light system and consists of a 'virtual spectrometer' feature, that takes into account user and ambient variables, uses interpolation curves, and that could be further refined by using external hardware; navigation is included on a touchscreen-enabled device for said feature. The system also includes a 'gray card ambient light detection' feature.

6 Claims, 10 Drawing Sheets

Figure 1:
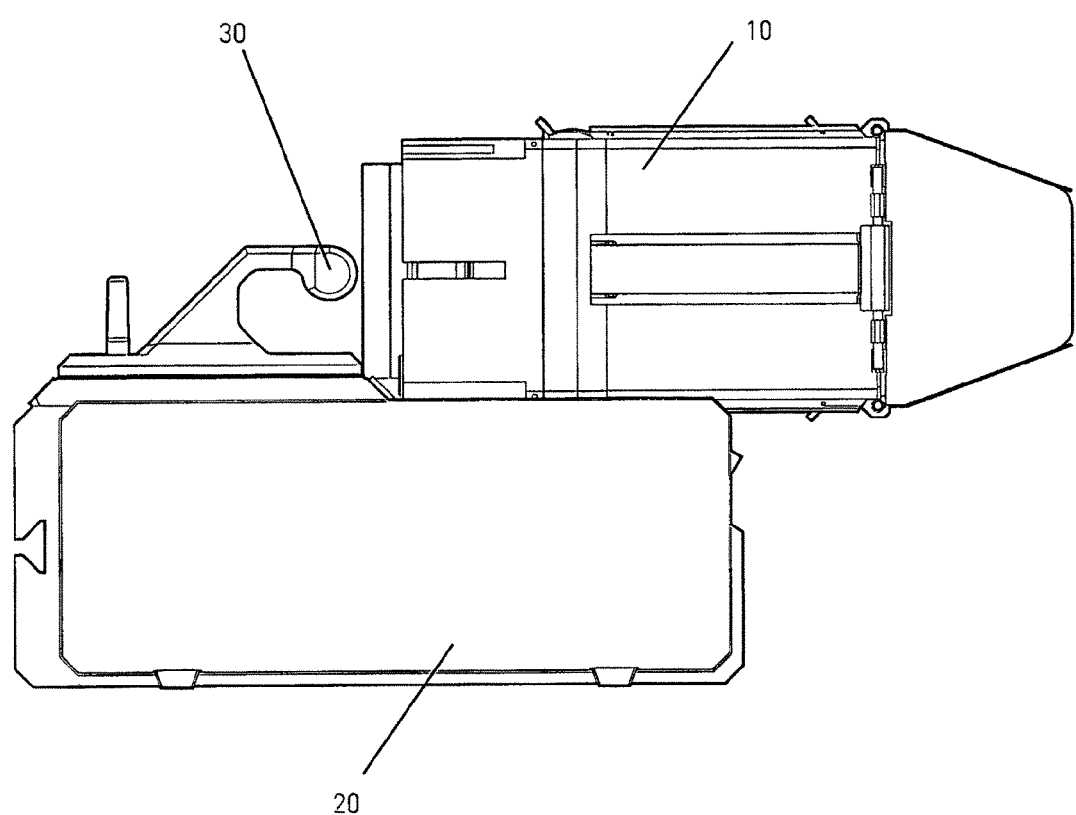

(51) Int. Cl.
*H05B 33/08* (2006.01)
*F21V 29/508* (2015.01)
*F21V 29/02* (2006.01)
*G01J 3/10* (2006.01)
*G01J 3/28* (2006.01)
*F21W 131/406* (2006.01)
*F21Y 101/02* (2006.01)
*F21Y 105/00* (2016.01)

(52) U.S. Cl.
CPC .. *G01J 3/10* (2013.01); *G01J 3/28* (2013.01); *H05B 33/086* (2013.01); *F21W 2131/406* (2013.01); *F21Y 2101/02* (2013.01); *F21Y 2105/001* (2013.01)

(56) References Cited

U.S. PATENT DOCUMENTS

| | | | | |
|---|---|---|---|---|
| 8,436,556 B2* | 5/2013 | Eisele | ............... | H05B 33/0857 315/152 |
| 8,820,972 B2* | 9/2014 | Mollnow | ............... | F21S 10/02 362/228 |
| 8,888,294 B2* | 11/2014 | Kjær | ............... | F21S 10/007 353/100 |
| 9,212,808 B2* | 12/2015 | Higley | ............... | F21V 23/026 |
| 9,249,966 B1* | 2/2016 | Hooi | ............... | F21K 9/10 |
| 2004/0105261 A1* | 6/2004 | Ducharme | ......... | H05B 33/0857 362/231 |
| 2004/0160199 A1* | 8/2004 | Morgan | ............... | A01M 1/04 315/312 |
| 2005/0276053 A1* | 12/2005 | Nortrup | ............... | F21S 48/325 362/294 |
| 2008/0231201 A1* | 9/2008 | Higley | ............... | F21V 15/01 315/185 R |
| 2008/0285271 A1* | 11/2008 | Roberge | ............... | F21S 8/033 362/235 |
| 2009/0207604 A1* | 8/2009 | Robotham | ............... | F21S 10/02 362/230 |
| 2010/0134016 A1* | 6/2010 | York | ............... | F21K 9/54 315/113 |
| 2011/0285292 A1* | 11/2011 | Mollnow | ............... | F21S 10/02 315/113 |
| 2012/0313980 A1* | 12/2012 | Kjaer | ............... | F21S 10/007 345/690 |
| 2014/0268722 A1* | 9/2014 | Holland | ............... | F21V 21/096 362/218 |
| 2015/0035437 A1* | 2/2015 | Panopoulos | ............ | F21V 14/02 315/112 |

* cited by examiner

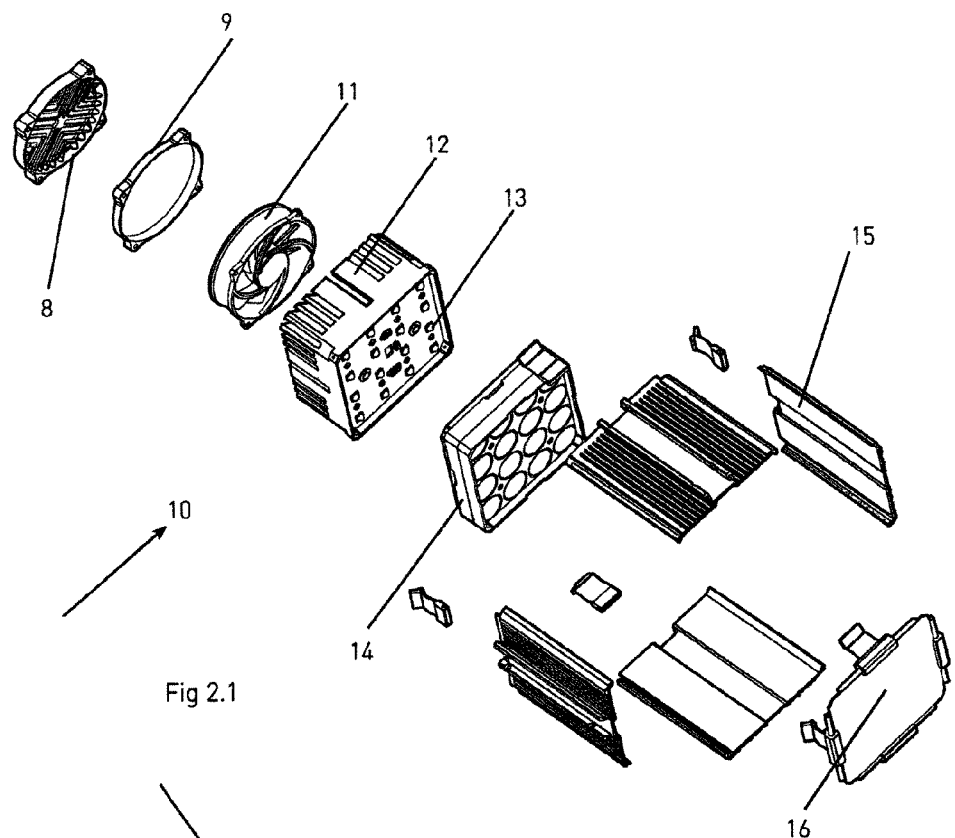
Fig 2.1
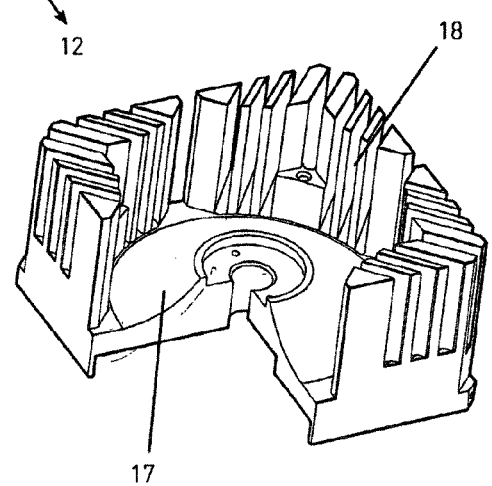
Fig 2.2

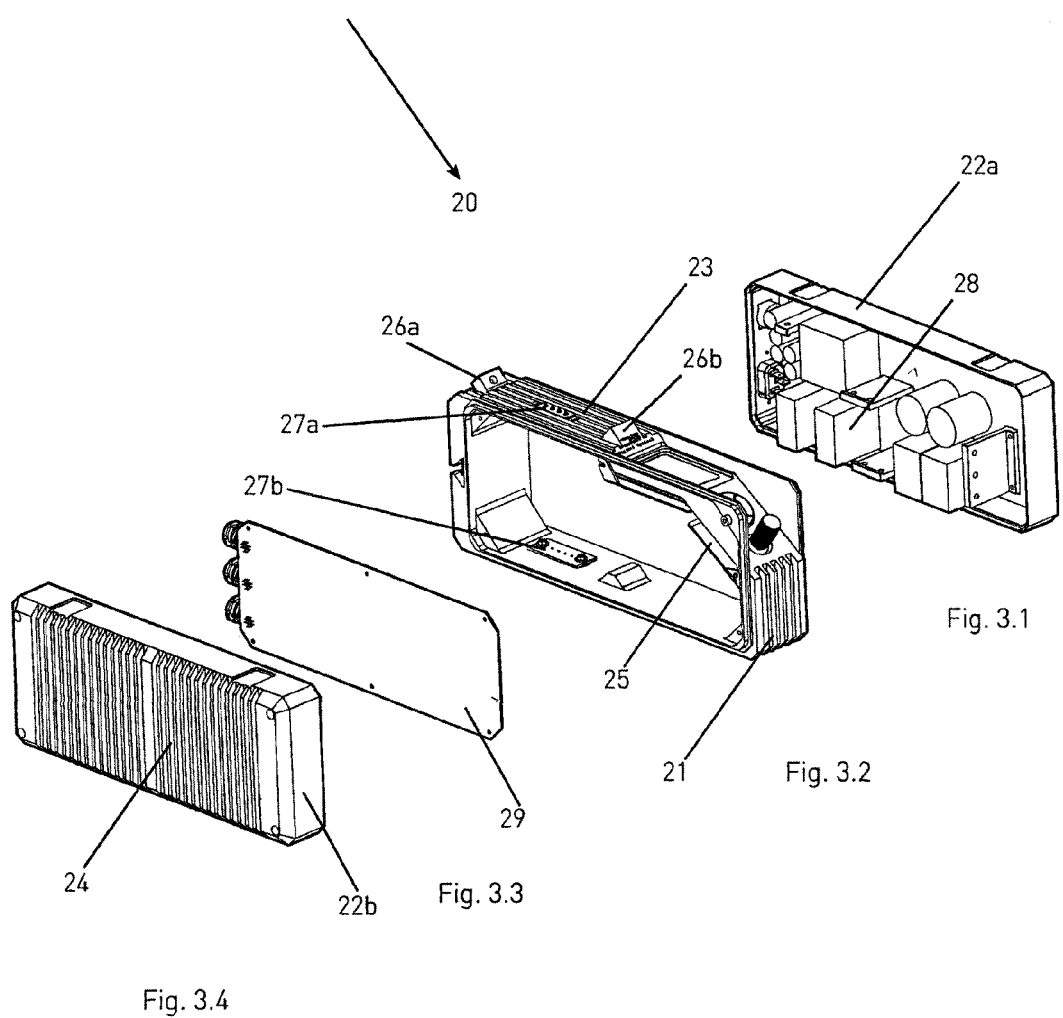

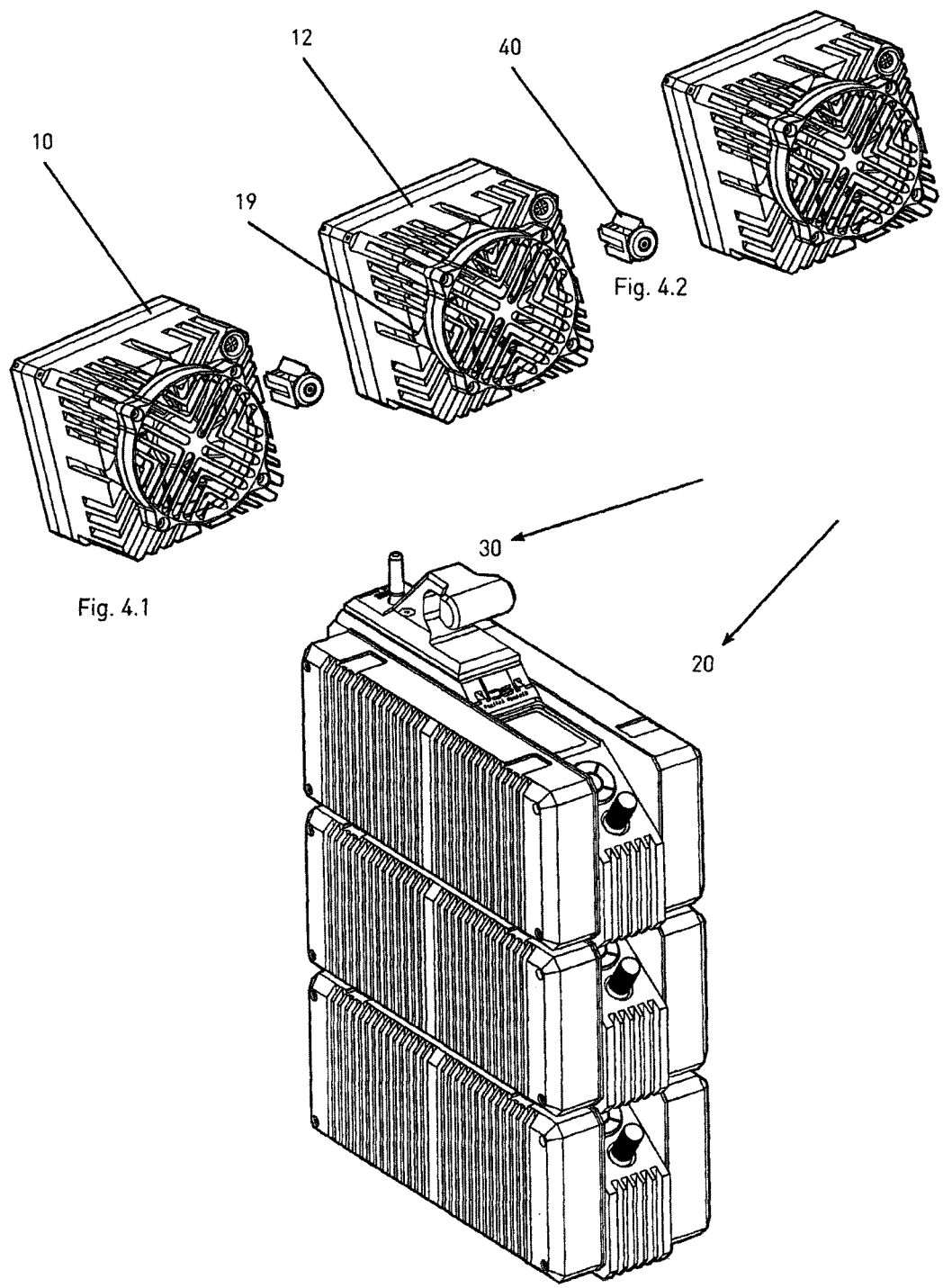

LIGHTING DEVICE AND SYSTEM FOR WIRELESS CALIBRATION AND CONTROLLING OF LIGHTING DEVICE

TECHNICAL FIELD

The present invention relates to the field of lighting devices and to the control system for lighting devices more specifically to lighting devices and to wireless light control system for controlling and monitoring the parameters of lighting devices used in film, television, video and photography. During film production on location or in a studio efficient lighting is of key importance.

STATE OF THE ART

Lighting and lighting systems are of central importance in film, television, video and photography and have a significant impact on the quality of the captured image.

A list of various light sources, that are used in image capturing, are described, for example in Gerald Millerson's book "Lighting for film and Television" (1991, p. 96-131 and 295-349), whereas most commonly used are incandescent, tungsten-halogen, xenon and HMI-based lighting fixtures.

The preferred lighting fixtures for past decades have been HID (high intensity discharge) type HMI (hydrargyrum medium-arc iodides) fixtures, which are ceramic halides, that are based on mercury vapor mixed with metal halides in a quartz-glass envelope, with two tungsten electrodes of medium arch separation.

In comparison with lighting generated by incandescent light sources the lighting efficiency of HMI is almost fourfold, ca. 85-108 lumens/w. HMI light is also closest to daylight when compared with incandescent and other light sources and therefore the light generated by HMI is most suitable to use for image capturing. As HMI emits large quantities of ultraviolet radiation and infrared radiation, then to ensure their safety the lighting fixtures are constructed of heavy and high-density materials, which must endure harmful rays as well as high temperatures. HMI based lighting fixtures are generally constructed of a thick Pyrex type glass lens and a metal housing. Due to aforelisted reasons the HMI fixtures are heavy and large in size and therefore set limits to their handling and transportation, which is of high importance in the process of image capturing.

U.S. Pat. No. 6,545,416 B1 Apr. 8, 2003 "Portable HMI Fixture with Integral Ballast" addresses the need for HMI fixtures that would be easier to operate, which is especially important due to the nature of image capturing process in television and motion picture industries where the location of lighting fixtures must be rearranged frequently and prompt setup and reconfiguration of the fixtures is required.

The device described in the patent enables to relocate the HMI lighting fixtures with increased efficiency and to shorten the time spent on arranging and re-positioning, which is achieved by integration of the ballast, that is large in measurements and required for HMI lighting, into the lighting fixture; thus eliminating the need to remake the connections on each subsequent time. However, in such configuration HMI lighting fixture remains too heavy and large in measurements to ensure flexibility and speed necessary for the film industry.

When compared to HMI lighting, the semiconductor technology based lighting fixtures, out of which LED's or light emitting diodes are the most common, do not emit large quantities of ultraviolet or infrared light and therefore lighting fixtures based on given technology do not require such high density construction elements and thus allow more compact and user friendly design solutions.

LED's also have greater flexibility when compared to HMI-s as they allow technical engineering solutions concerning geometry of rays and the positioning of lighting elements inside the housing, which would otherwise not be achievable with "bulky" HMI bulbs. In comparison with HMI's LED's also have significant advantage concerning their hours of operation. Depending on the producer the useful lifespan of LED's may be from 50 000 to 100 000 hours as opposed to HMI's with a useful lifespan of 500 to 1000 hours.

Patent Application US 2012/0127702 A1, published 24 May 2012, "Modular Led Lighting Assembly" discloses a modular LED lighting fixture. Applicant addresses the issue of the lack of LED lighting configurations on the marketplace and a demand for such solutions. The assembly disclosed in the patent application under review consists of one or multiple LED lighting modules and a detached power supply, which in preferred embodiment is electrically connected to the LED lighting modules with a plug connection, and a mount, that allows attaching modular lighting fixtures to the wall, ceiling or to other desired surface. Lighting assembly enables adjusting the configuration and position of the lighting assembly on the spot and based on individual needs. This allows grouping of modular lights into a large-surface lighting source or use them independently as well as change the angle and the direction of the light.

Lighting source can be used in a variety of environmental conditions and according to disclosed illustrative embodiment is configured to function on a wide temperature scale (from −20° until 50° C.) being also humidity- dust- and corrosion proof.

Separation of lighting module from power supply enables to minimize the measurements of the lighting source, which creates a significant advantage in user comfort as well as helps to decrease energy needs due to lower accumulation of heat within the assembly.

Modular LED lighting fixture under review has significant advantages concerning transportation and handling and offers a more energy-efficient solution in comparison with the conventional lighting sources; however, due to specifics of lighting needs of image capturing process, the disclosed invention has the following limitations:

In accordance with claim 1 the assembly under review consists of a mount, first lighting module carried by the mount; first lighting module, which includes plurality of LED's; power supply, having an alternating current input and a direct current output; and first electrical connector that connects selectively the first lighting module with the power supply in a way that allows the connection to be made and remade as desired.

As the claim 1 does not include a light amplifier nor a diffuser, which are necessary for color mixing, light focusing and diffusion, then the light produced by given LED lighting fixture results in shadows and lines of each individual LED and thus is not suitable for image capturing, which requires more consistent and smooth lighting.

In accordance with claim 2 the assembly contains a second lighting module, mounted on the mount, second lighting module that includes plurality of LED's. In accordance with claim 3 the assembly includes a second electrical connector that selectively connects the second lighting module to the first lighting module in a way that allows the connection to be made and remade as desired. The connection feature of the assembly in the claims 2 and 3 allows grouping lighting modules into a larger lighting source, but does not ensure the constancy of light source centers throughout the system for the purposes of generating a homogenous lighting surface, necessary for example for image capturing. The assembly under review also limits the number of lighting modules that may be joined together to maximum of two.

In accordance with claim 5 the assembly includes a mount that includes a base and a housing where first lighting module is being carried by the housing and the housing being carried by the base. The claims 5 to 10 describe a variety of mounting solutions. It allows adjusting the light direction produced by LED lighting modules by using variety of positions for the lighting modules; however from the disclosure of the assembly and claims 5 to 10 the lighting module does not allow changing the light direction without changing the other housing, which has a constant direction of light. Such a solution does not ensure the capacity to regulate the direction of the produced light in a scope that is necessary for the purposes of image capturing. The requirement to mount the assembly to a surface also sets limits to its mobility, which is necessary for image capturing.

Patent application EP 2025999 A2, published 18 Feb. 2009, "Power LED Lighting Assembly having a forced air cooling device comprising a heat sink and a fan" describes a compact LED lighting assembly, that ensures sufficient cooling by heat release via heat sink fan that is necessary for increased number of LED's and provides high light efficiency without changes in color temperature.

In accordance with claim 1 the LED lighting assembly comprises of a LED board carrying a plurality of power LEDs mounted thereon and having air openings for air ventilation, a heat sink for release of heat to be generated from the LEDs, a heat sink enclosure and a micro fan. Inside the heat sink enclosure the LED board is placed to close proximity to the heat sink and forced air circulation and ventilation is resulted within, with the aid of a micro fan.

In accordance with claim 2 the air openings of the LED lighting assembly, the LED board and the heat sink enclosure are formed to draw outside air into the interior of the heat sink enclosure for forced air ventilation and circulation. In the preferred embodiment of the invention the used LED's are with the power of 1 W, whereas a single board carries 6 LED's with the power in total of 6 watts.

The lighting assembly is suitable for use as a spot light however problematic to be used as a lighting source for image capturing purposes due to following reasons:

The lighting power required for image capturing is greater by an order of magnitude and based on the surface usage of the heat sink (the total surface area of the radiator) the cooling system is not scalable and thus does not allow achieving necessary lighting capacity;

Lighting assembly does not include a light amplifier nor a diffuser, which are necessary. for color mixing, light focusing and diffusion, thus the light generated by the LED lighting assembly results in shadows and lines produced by each individual LED. As the inflow of external air for cooling purposes is also coming from the front side (FIG. 12), then it does not allow installation of a diffuser, which would otherwise seal the front.

The small diameter of micro fan blades produces high levels of noise during operation;

There is no option to group the lighting assemblies due to lack of mechanical attachment possibilities nor possibility to group them in a manner that would ensure constancy of light source centers throughout the lighting system in a joined state to create a uniform light surface for image capturing.

Patent Application US 2011/127481 A2 and US 2012/0087102 A1 "On-camera LED Fresnel lighting system including active cooling" discloses a lighting fixture that is used in film and television for capturing of a moving image and video and which includes a Fresnel lens fixed in a housing which contains tight array of high powered LED's. LED panel is mated to a heat dissipating apparatus for the purposes of active cooling and together forming a LED engine. The process of active cooling may be followed from a monitor.

Due to LEDs the lighting fixture allows using Fresnel lense instead of high thickness glass lense that is commonly used and required for HMI lighting fixtures. Active cooling also resolves the evacuation of the heat resulting from placement of LEDs in a tight array. In preferred embodiment the fixture uses two colors of light sources and the power supply is located in the same housing with the LED engine.

In accordance with claim 1 the lighting fixture consists of a housing that includes LED engine and an adapter, which allows to mount the housing to the camera. In accordance with claims 2 and 3 the housing contains at least one or multiple high powered LEDs in a tight array.

Lighting fixture under review is mainly intended to be mounted on camera and does not provide an option to be grouped into a larger lighting source nor designed to ensure constancy of light source centers throughout the lighting system when joined together to create a uniform lighting surface that is essential for image capturing.

Described lighting fixture does not offer a solution for minimizing the absorbance of rays generated by light sources inside the housing of the lighting fixture for maximal usage of the reflection and diffusion properties of the housing, which functions as a spacer between the light sources of the lighting fixture and the final outlet surface.

The patent description reveals the problematics related to handling based on the parameters of conventional HMI lighting fixtures, which impose significant constraints on usage of lighting fixtures. As a solution, the disclosure under review proposes to use plastic Fresnel lenses instead of lenses made from high-thickness materials (like Pyrex glass) and therefore allows to improve the parameters and ease of handling in comparison with traditional HMI lighting fixtures; however, as the solution is based on replacement of light sources with LED's then it does not provide a finalized solution to current issues. Limitations to parameters and user comfort are resulting from placement of the LED's into the same housing with the power supply, which increases the necessity for additional active cooling due to excess heat that is generated.

Although LED's based on semiconductor technology have been used extensively in image capturing, the use of such lighting fixtures is limited to be used as additional lighting sources and not as the main lighting source. Due to physical characteristics of semiconductor technology based lighting sources including LEDs, currently known configurations do not allow to achieve necessary lighting power and ensure lighting properties that are needed specifically for image capturing purposes.

Therefore there is a need for a compact, reliable and lightweight lighting fixture with wide lighting profile that has the advantages of semiconductor based lighting fixture, but which has sufficient lighting capacity and necessary technical parameters that would allow for it to be used as the main lighting source for moving and still image capturing instead of conventional HMI lighting fixtures.

A need also exists for the ability of calibrating and controlling said lighting devices for image acquisition.

The publication by L Fauch "*Acquisition of multispectral color images using light-emitting diodes*", University of Eastern Finland Faculty of Science and Forestry. Dissertation. Kuopio, 2012, describes a method of using light-emitting diode(s) with multiple spectra to quickly measure the reflected spectra of objects with high accuracy. The publication describes one of the uses of multi-spectral light sources to acquire reflected spectra.

The publication by D. Nyström "*Colorimetric and Multispectral Image Acquisition*", Linköping University. Dept. of Science and Technology, Norrköping, 2006, describes a method of calibrating a system for acquisition of colorimetric and multispectral images. Furthermore, the spectral sensitivity of the camera is also measured, which is useful in the field of image acquisition where spectral sensitivity of the camera is unknown. The experimental setup however uses a tungsten-halogen lamp with color filters for reflectance imaging.

Present invention allows for calibrating and controlling light in a color space using interpolation tables, with the preferred embodiment using light emitting diodes without color filters, and with the possible use of virtual filters (i.e. different points in color space) using the 'virtual spectrometer' feature, for the use in the field of image acquisition. Ohto, N. and Robertson, A. R. "*CIE Standard calorimetric System, Colorimetry Fundamentals and Applications*" (2005) Wiley—IS&T Series, describe colorimetry systems that are of potential use in present invention, especially the standard color spaces (e.g. CIE-1931).

The present invention describes the use of a light system to calibrate light source drivers, and navigate in this calibrated color space, with potential use described in this publication.

The light emitting diode (LED) standards as of this writing: RP-16, ANSI C78.377, IES LM-79-2008, IES LM-80-2008, TM-21, etc., have been further refined by manufacturers of said diodes. Present invention allows for calibrating light fixtures equipped with LEDs to further refine bin-specific sorting (with 'bins' being the areas of color space described by manufacturers for sorting batches of LEDs).

U.S. Pat. No. 8,306,051 B2, published on Nov. 6, 2012, "Communication protocol for a lighting control system" describes a communication protocol for a lighting control system having a plurality of control devices coupled to a communication link that uses a polling technique to coordinate the transmission of digital messages between the control devices. This analogous solution provides some means for identification different lighting modules, however suffers from numerous problems described herein. In the preferred embodiment of the publication under review, the communication link (114) described in this analogous solution, is of the baud rate and settings not compatible with industry standards such as DMX, thereby not allowing different wired or wireless protocols to be used. Also, the usage of semi-permanent "Poll IDs" instead of slave serial numbers (with the reason described as "serial numbers are quite large numbers") and the according method for this claimed in claim 1, is limiting in a way that requires multiple steps for the acquisition of a slave serial number.

Patent no. EP 1938666 B1, published on May 30, 2012, "Color control of dynamic lighting", describes a possibility for mapping color space into other coordinates, and varying light color by varying intensities of different light sources using a color space, however the described system is simplistic in a way that it does not take into account different user input and ambient parameters that affect light distribution, which are essential for color consistency control; it also lacks the possibility of calibrating bitmaps on per-spectrum basis and interpolating between them during use; the publication under review also lacks the possibility of further correcting these maps using an external spectrometer.

Patent application no. EP 1610593 A2, published on Dec. 28, 2005, entitled "Generation of white light with Light Emitting Diodes having different spectrum" describes the generation of white light (claim 1) using multiple LEDs. This publication includes a calibration system to vary the light generated by the lighting fixture based on the measured color characteristics (claim 30) with the usage of a sensor (claim 29), however it does not take into account homogeneous or heterogeneous (with different calculation precision levels defined as areas of color space) mapping of color space and using interpolable look-up bitmaps ('nodes') to take various user and ambient variables into account for better color consistency.

Patent application no. EP 2539768 A1, published on Jan. 2, 2013, entitled "Calibration method for led lighting systems", describes a method for calibrating a lighting fixture comprising a plurality of discrete illumination sources of distinguishably different color coordinates (claim 1), where however heterogeneous mapping with different areas of color space corresponding to different precision levels of the calculation iteration algorithm is not defined; these areas would allow for a more efficient use of computational resources.

Patent application WO 2013165775 A1 'Algorithm for Color Corrected Analog Dimming in Multi-Color Led System', published on Nov. 7, 2012 provides improvements in color corrected dimming used in multi-spectral lighting systems, however does not describe a method for measuring and using bitmapped interpolable color space (e.g. CIE-1931) look-up tables for all the combinations of input (e.g. ambient) parameters, to cover the said color space homogeneously or heterogeneously (with different calculation precision levels defined as areas of color space) in the color space area boundaries a multi-spectral light source is capable of covering.

Usually, a gray or white card is used for calibrating light temperature output and setting white balance for a camera, for example the conventional use in photography is described in the U.S. Pat. No. 8,233,785 B1 "Photography Station", published on Jun. 4, 2013; or, regarding measuring absorption and scattering of light, a gray card is of use in patent application WO 2013042742 A1 "Calibration apparatus and calibration method", published on Mar. 28, 2013. However, current solutions do not address a myriad of available standard embedded cameras (such as these used in mobile phones and tablets) that can be adapted, through software and by using a standard gray card, for color temperature replication using multi-spectral light sources.

U.S. Pat. No. 8,513,891 B2, published on Aug. 20, 2013 'Wireless Light Control System With Control Apparatus and Method Thereof' describes a wireless light control apparatus and method for stage lights.

According to claim 1 of the disclosure the wireless light control system with a control apparatus for the purposes of controlling a plurality of stage light modules comprises of a controller with a light-adjusting module, a scene generator and a command-converting module. The light-adjusting module has a plurality of channel pages, where each of the channel pages have a plurality of channels corresponding respectively to a plurality of light control parameters to allow the light-adjusting module to adjust the light control parameters.

The scene generator is checking whether a plurality of scene fields have correspondingly a plurality of scene setting parameters for determining either waiting for a scene setting parameter generated by the scene generator for the scene field or storing the adjusted light control parameter into the scene field and the scene generator further combines some of the light control parameters for forming each of scene setting parameters. The command-converting module converts the light control parameters and the scene setting parameters into a plurality of 'light control commands' (with 'light control command' used here and hereafter in the context of commands created after inputting desired light settings in a controlling module, with necessary processing, sent to an output module that outputs desired light) and a plurality of scene control commands respectively based on a light control protocol. A wireless transmission module, coupled with the controller is transmitting the light control commands and the scene control commands to the stage light modules according to a wireless transmission protocol. A memory unit is coupled with the controller, storing the light control parameters and the scene setting parameters. A display unit is coupled with the controller for the purposes of displaying the light control parameters of the light control commands, the channel pages and the channels, and displaying the scene setting parameters of the scene control commands. A plurality of receiving units are coupled with the light control apparatus respectively and corresponding to the stage light modules respectively, receiving the light control commands and the scene control commands for driving the stage light modules.

The disclosure under review provides a wireless light control system and simplifies the control architecture of stage light modules. However, considering the specifics of lighting for image capturing, the system has the following limitations:

Virtual spectrometer limitation. The external light control device (the light control apparatus as named in the disclosure under review) does not have the possibility of acquiring bitmapped look-up table calibration data for homogeneously or heterogeneously (with different calculation precision levels defined as areas of color space) covering a color space (e.g. CIE-1931) for all the combinations of input (e.g. ambient) parameters that is necessary for smooth color space navigation and ensuring color consistency. The disclosure also does not address the issue of user control and unrestricted (not fixed to a particular smaller area of color space) navigation in the portion of color space the multi-spectral light sources are capable of covering, that is necessary in the cases when e.g. acquiring images in a scene requires uniform light color (luminance, hue and saturation) conditions throughout said scene.

Communications limitations. Another limitation of the disclosure is related to communication, as the light control apparatus' (104) is not specified to have bidirectional fault reporting and calibration communications via (108) links. Considering the nature of image capturing process which could take place in e.g. extreme environmental conditions with large ambient temperature and humidity fluctuations, where color consistency and unit reliability are of vital importance, there is a need for a calibration and monitoring system that allows more refined automatic control over each element in the system, with the possibility of prolonging the useful lifetime of the system by specifying safe ranges of measured variables and automatically taking measured variables into account.

Synchronization. The disclosure under review does not provide a possibility of synchronizing light control command values between the light control apparatus' (104) and any of the 'stage light modules' (102a). For example, if the light control apparatus' is relatively far away from the 'stage light modules', manual control over the 'stage light modules' is troublesome which could cause delays during film, television, video and/or photo production.

Modularity. One of the most crucial limitations of the disclosure under review is the lack of different 'light control apparatus' (104) settings or attachable modules that would allow communication over different protocols (with the specified one in the disclosure claim 19 being Digital MultipleX DMX-512). In the fields of film, television and photography it may be necessary to use different protocols with different levels of control, with one system suitable both for widely used protocols (e.g. DMX-512 in a television studio) and various open-source and proprietary protocols.

SUMMARY OF THE INVENTION

Lighting device based on semiconductor technology is miniature and mobile and designed according to specific lighting requirements for image capturing with the purposes of creating an efficient, universal and energy efficient lighting source primarily for such purposes.

The device consists of lighting modules that may be grouped together, power supply and control module and a controller unit. Single power supply and control module has the capacity to service one or multiple lighting modules. Power supply and control modules may be grouped and can be controlled in a group as a single unit. Lighting device allows using light sources of various colors and temperatures.

The housing of the lighting module and power supply and control module dissipate the heat generated by the use of high power light sources through heat dissipating channels and thus decrease the energy needs for active cooling.

The objective of the invention is to provide:

1. a lighting device that enables to join lighting modules in a variety of configurations into a single light source, while ensuring the constancy of light source centers throughout the system when grouped together;

2. a miniature, lightweight and compact lighting device, that ensures high lighting power in volume to weight ratio;

3. a lighting device with high reliability that may be used on a wide temperature scale and in various environmental conditions;

4. an energy efficient lighting device, where the housing of the device functions as a part of the cooling system to reduce the necessity for active cooling and allow minimizing of the dimensions and weight of the device.

Another objective of the present invention is to provide an intelligent light control system that is especially suitable for use in image capturing process and which consists of:

a power supply and control unit, which in turn consists of
    a power supply and a dimmer unit, and which can be connected via communications links with other power supply and control units to form a 'stack', and an attachable module which enables communications between a single or multiple power supply and control units via various wired and wireless protocols with an external light control device;

said dimmer unit contains the following interconnected elements: a controller unit with specialized software described herein, various peripheral units, and a light driver unit, with the latter unit having power and communications links with a plurality of lamp modules;

said external light control device, in the preferred embodiment, contains specialized software described herein for the use with the 'virtual spectrometer' and 'gray card ambient light detection' algorithms.

The purpose of this invention is to provide software functionality to a light system that would enhance user experience and save time during lighting operations and in post-production in the fields of film, video, photo and television, with the following specific demands for the present invention:

1. A system that includes general packet communications between modular systems and interconnected subsystems and mixing of light in a multi-spectral light source. The communications solution that provides the necessary means to control, through wired and/or wireless modules, of light consistency, synchronization of control command parameters between different units, grouping ability, full-scale dimming, error control and communications with an external light control device in order to simplify and speed up lighting operations.

2. A system that supports a 'virtual spectrometer' software feature that includes calibration of the bitmap look-up tables and control with full user navigation in a color space (e.g. CIE-1931) for multi-spectral light sources, that takes into account a plurality of user and ambient variables, that could be further enhanced by using external spectrometer hardware. An algorithm that can be used in conjunction with the 'gray card ambient light detection' algorithm helps users by speeding up the setup and replication of desirable colors.

LIST OF DRAWINGS

Figure 5:
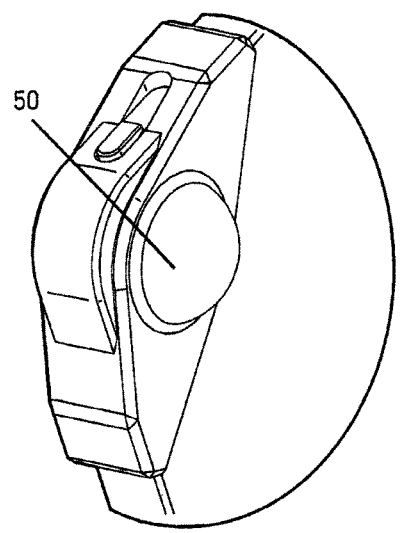
Figure 6:
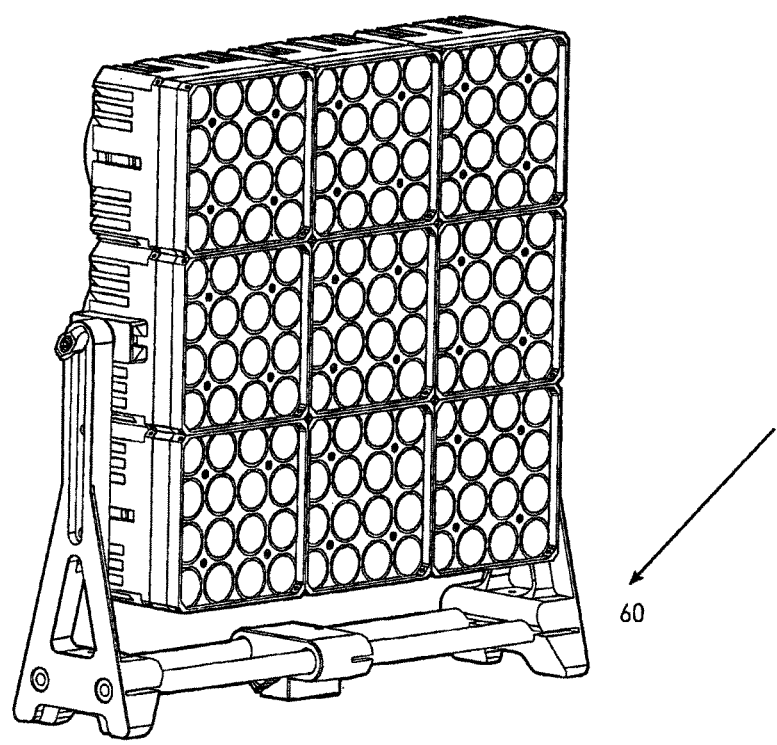
Figure 7:
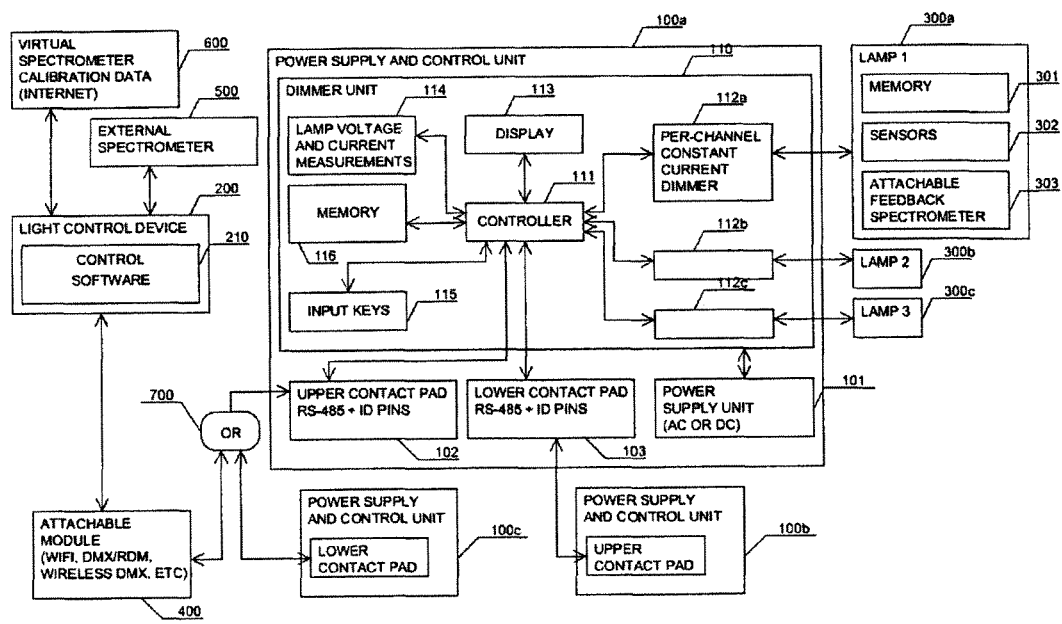
Figure 8:
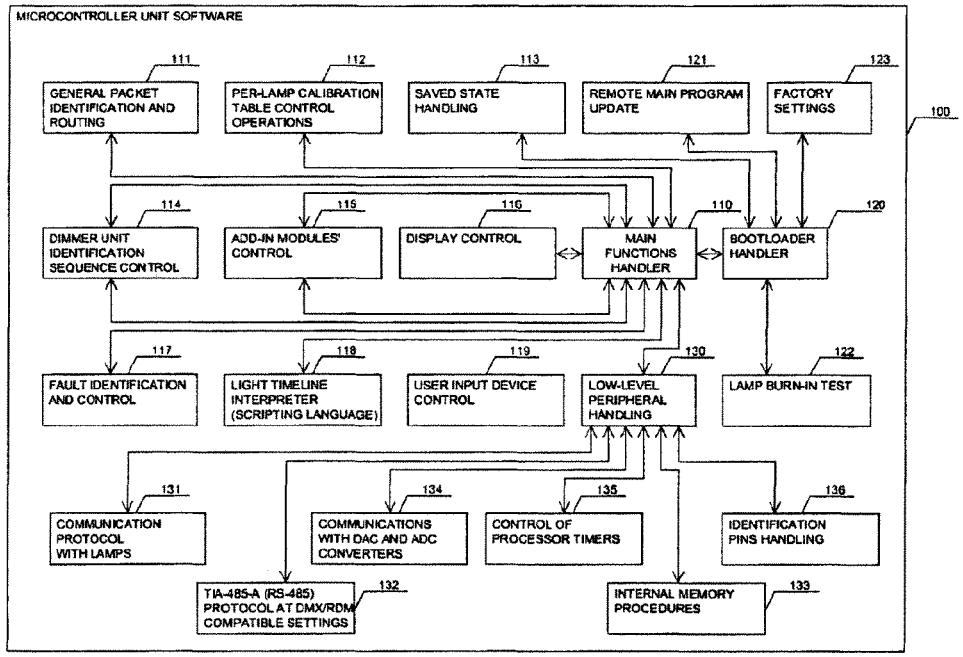
Figure 9:
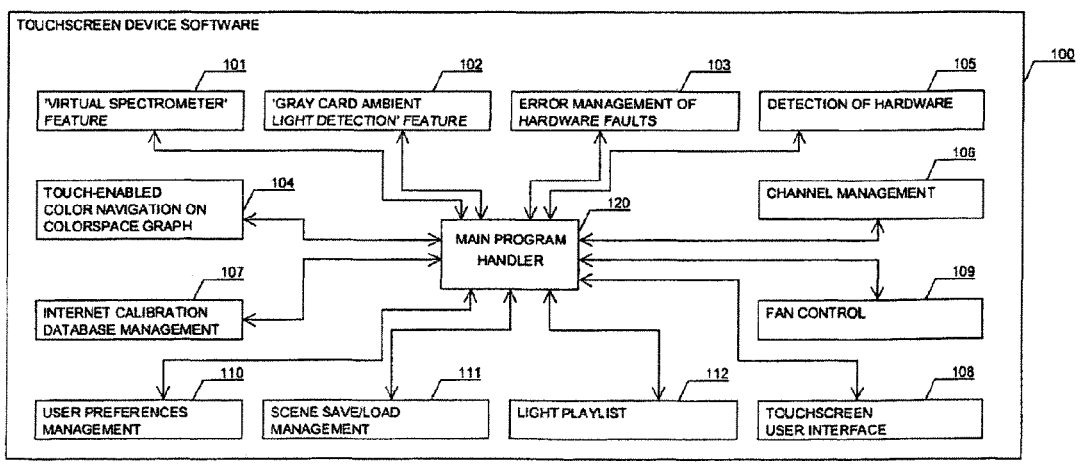
Figure 10:
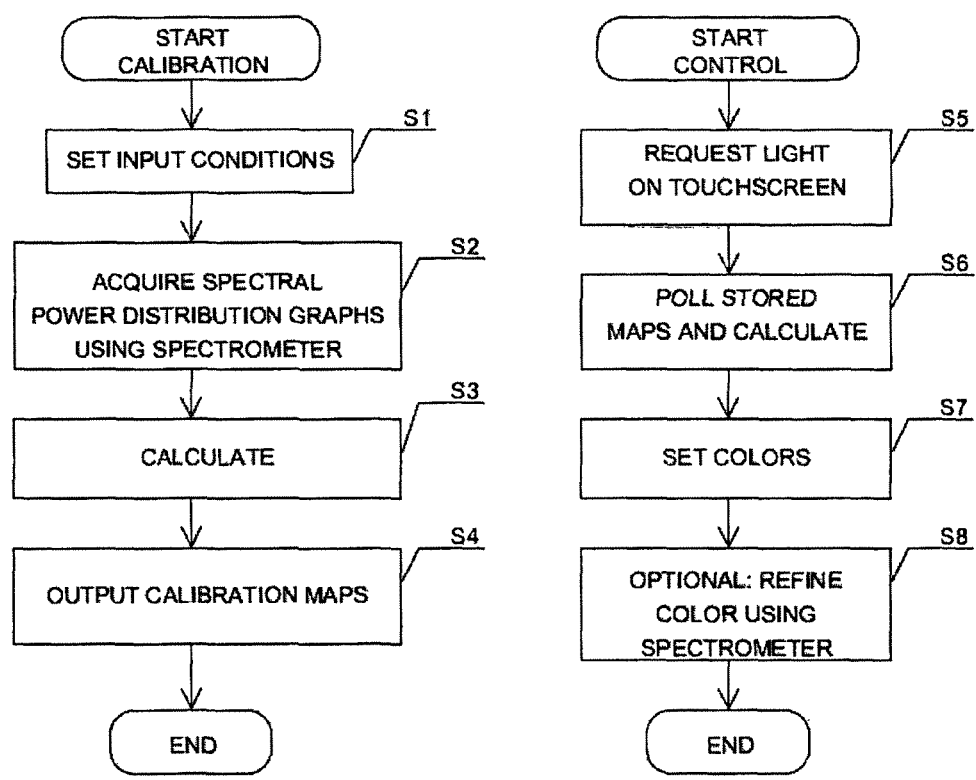
Figure 11:
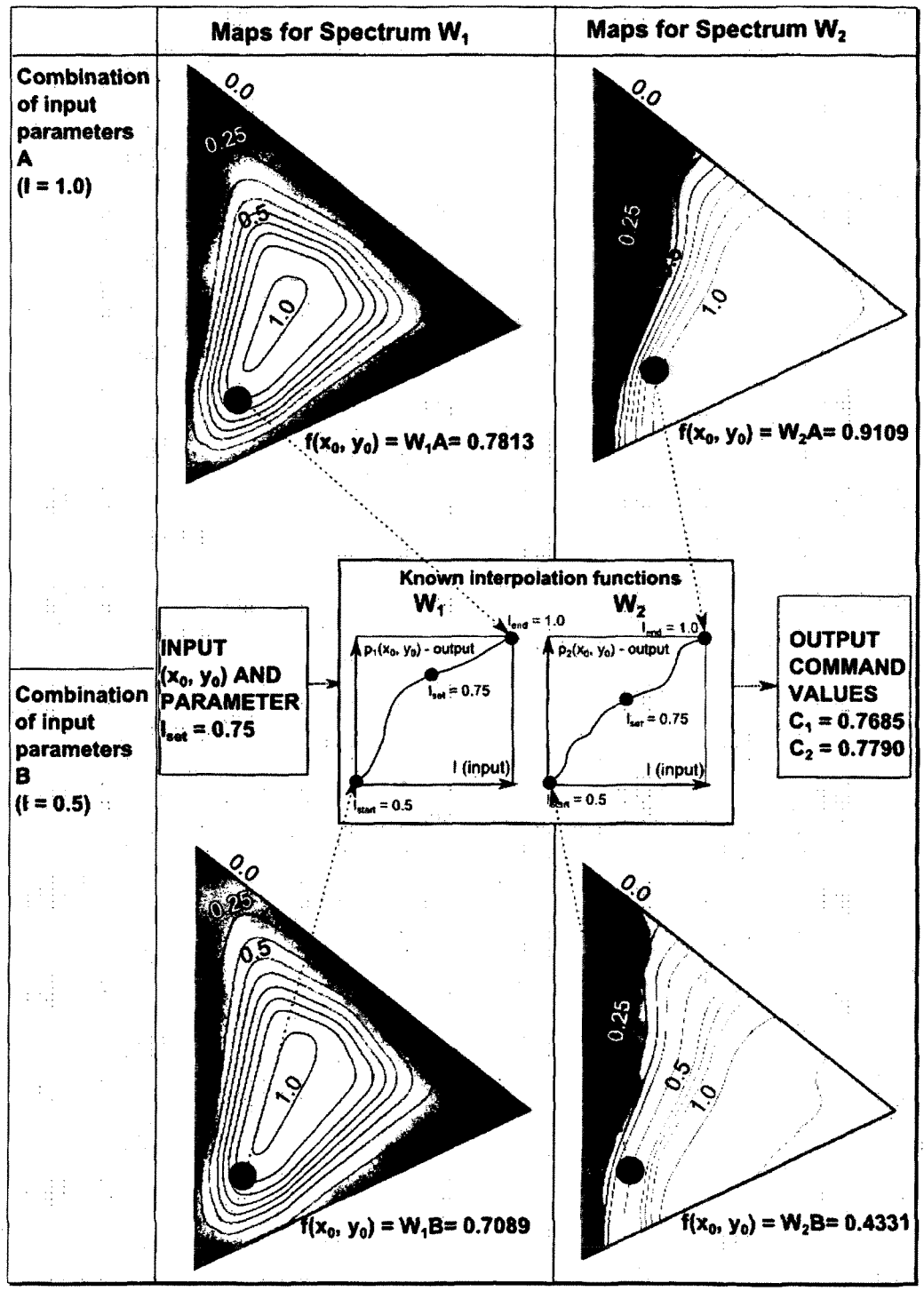
Figure 12:
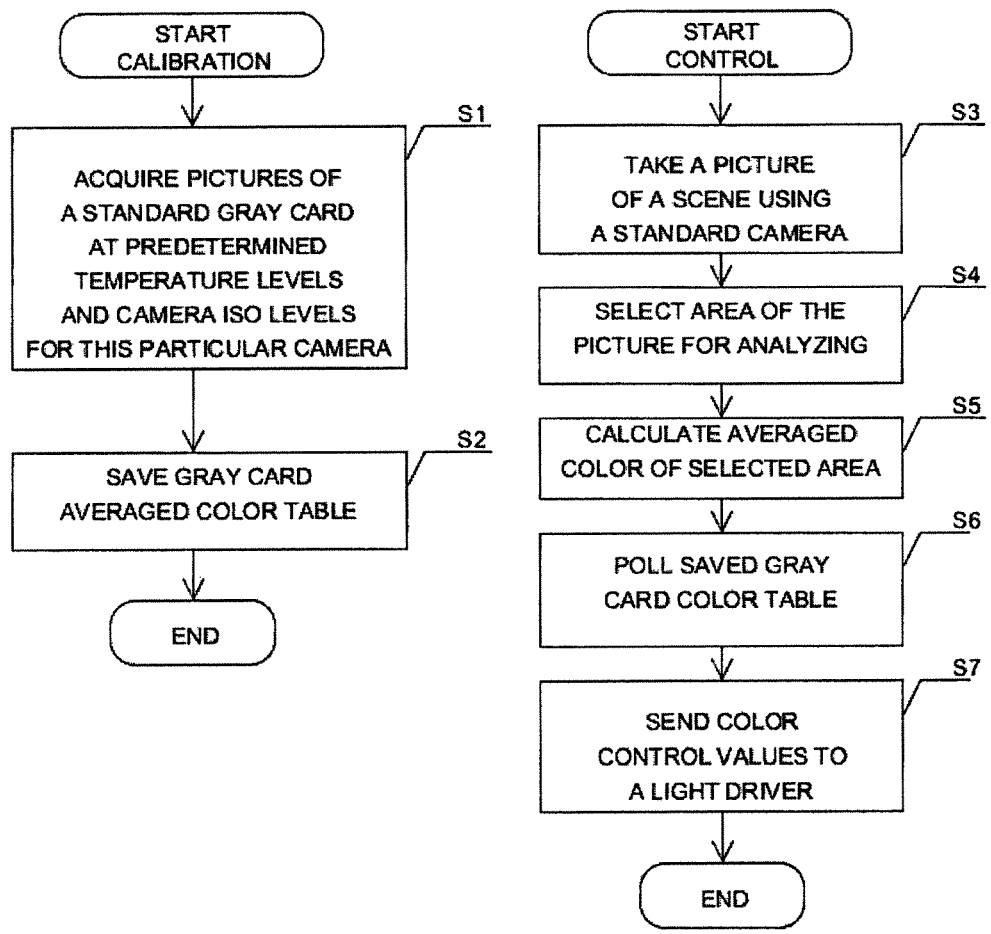

For the purposes of explaining the invention the drawings FIG. 1 to FIG. 12 are presented, in which:

FIG. 1 illustrates the side-view of the lighting device;
FIG. 2.1 and FIG. 2.2 illustrate the lighting module;
FIG. 3.1 until FIG. 3.4 illustrate the construction elements of the power supply and control-unit;
FIG. 4.1. illustrates the grouping system of the lighting modules;
FIG. 4.2. illustrates the general view of the lighting device in grouped blocks;
FIG. 4.3 illustrates power supply and control modules.
FIG. 5 illustrates the dome shaped accessory device for camera lens;
FIG. 6 illustrates the set of lighting modules on an adjustable stand (e.g. tripod);
FIG. 7 is a block diagram of the overall system in a preferred embodiment;
FIG. 8 is a block diagram of the controller unit (FIG. 7-111) in a preferred embodiment;
FIG. 9 is a block diagram of the external light control device (FIG. 7-200);
FIG. 10 is a block diagram of the 'virtual spectrometer' feature (general concept);
FIG. 11 is a diagram of a simplified example of one of a multitude of embodiments for the 'virtual spectrometer' feature, used in an external light control device (FIG. 7-200);
FIG. 12 is a block diagram of the general concept of the 'gray card' feature (part of FIG. 9).

DETAILED DESCRIPTION OF THE DRAWINGS

List of Construction Elements in FIG. 1-FIG. 6

8—protective shield of the cooling radiator
9—spacer ring
10—lighting module
11—active cooling device
12—housing acting as a passive cooling device
13—light source
14—light amplifier
15—spacer
16—light diffuser
17—construction element
18—heat dissipation channels
19—interlock key opening
20—power supply and control module
21—housing
22a and 22b—sides of the housing
23—heat dissipation channels
24—heat dissipation channels
25—manual control board
26a and 26b—fastening elements
27a—upper terminal pad
27b lower contact pad
28—current transformer
29—electronics unit
30—control unit
40—interlock key
50—dome shaped accessory device
60—adjustable stand List of Construction Elements in FIG. 7-FIG. 12

FIG. 7
7-100a-100c Power Supply and Control Unit
7-101 Power Supply Unit (AC or DC)
7-102 Upper Contact Pad
7-103 Lower Contact Pad
7-110 Dimmer Unit
7-111 Controller
7-112a-112c Per-Channel Constant Current Dimmer
7-113 Display
7-114 Lamp Voltage and Current Measurements
7-115 Input Keys
7-116 Memory
7-200 Light Control Device
7-210 Control Software
7-300a-300c Lamp (lighting module)
7-301 Memory
7-302 Sensors
7-303 Attachable Feedback Spectrometer
7-400 Attachable Module
7-500 External Spectrometer
7-600 Virtual Spectrometer Calibration Data (Internet)
7-700 'OR' bifurcation
FIG. 8
8-100 Microcontroller Unit Software
8-110 Main Functions Handler
8-111 General Packet Identification and Routing
8-112 Per-Lamp Calibration Table Control Operations
8-113 Saved State Handling
8-114 Dimmer Unit Identification Sequence Control
8-115 Add-In Modules Control 8-116 Display Control
8-117 Fault Identification and Control
8-118 Light Timeline Interpreter (scripting language)
8-119 User Input Device Control
8-120 Bootloader
8-121 Remote Main Program Update
8-122 Lamp Burn-in Test
8-123 Factory Settings
8-130 Lower-Level Peripheral Handling
8-131 Communication Protocol with Laps
8-132 TIA-485-A (RS-485) Protocol at DMX/RDM Compatible Settings
8-133 Internal Memory Procedures
8-134 Communications with DAC and ADC Converters
8-135 Control of Processor Timers
8-136 Identification Pins Handling
FIG. 9.
9-100 Touchscreen Device Software
9-101 Virtual Spectrometer Device
9-102 Gray Card Ambient Light Detection Feature
9-103 Error Management of Hardware Faults
9-104 Touch Enabled Color Navigation on Colorspace Graph
9-105 Detection of Hardware
9-106 Channel Management
9-107 Internet Calibration Database Management
9-108 Touchscreen User Interface
9-109 Fan Control
9-110 User Preferences Management
9-111 Scene Save/Load Management
9-112 Light Playlist
9-120 Main Program Handler
FIG. 10
10-S1 Set Input Conditions
10-S2 Acquire Spectral Power Distribution Graphs Using Spectrometer
10-S3 Calculate
10-S4 Output Calibration Maps
10-S5 Request Light on Touchscreen
10-S6 Poll Stored Maps and Calculate
10-S7 Set Colors
10-S8 Optional: Refine Color Using Spectrometer
FIG. 12
12-S1 Acquire pictures of a standard gray card at predetermined temperature levels and camera ISO levels for this particular camera
12-S2 Save gray card averaged color table
12-S3 Take a picture of a scene using a standard camera
12-S4 Select area of the picture for analyzing
12-S5 Calculate averaged color of selected area
12-S6 Poll saved gray card color table
12-S7 Send color control values to a light driver Lighting device of FIG. 1 may be assembled from single or multiple lighting modules 10 and single or multiple power supply and control modules 20 that are connected with lighting modules and a control unit 30.

Basic elements of the lighting module of FIG. 2.1 are active cooling device 11, housing acting as a passive cooling device 12, light sources 13, light amplifier 14, reflective spacer 15 and a light diffuser 16.

Printed circuit board holding the light sources 13 in the lighting module 10 is designed to ensure the constancy of the light source 13 centers throughout the system when lighting modules 10 are grouped together.

Coaction between the light amplifier 14, reflective spacer 15 and light diffuser 16 enables to achieve a uniform light stream to the lighted surface while minimizing the absorption. There are micro lenses located on the exterior surface of the light diffuser 16 that allow controlling the output angle or the light.

The housing acting as a passive cooling device 12 of the lighting module 10 on the FIG. 2.2. contains a curved element roughly derived from rotating a parabolic cross-section 17, which is located under the active cooling device 11 to improve the efficiency of the active cooling by redirecting the cooling stream under an angle.

Housing acting as a passive cooling device 12, includes heat dissipation channels 18, that are positioned under an angle in relation to each other in a manner, that hinders the passage of warm airflow between the lighting modules that are joined with each other horizontally and vertically.

When connected diagonally the passage of warm airflow from diagonally connected lighting module 10 is with maximum resistance due to the length of the heat dissipation channels 18 and upward direction of the airflow.

FIG. 3.1.-FIG. 3.4. illustrate the construction elements of the power supply and control module.

Power supply and control module 20 consists of a housing acting as a passive cooling device 21, two sides of the housing 22a and 22b, fastening heat dissipation channels 23 located on the housing, vertical heat dissipation channels 24 located on the sides, manual control board 25, two fastening elements 26a and 26b, control communication elements—upper terminal pad 27a and lower contact pad 27b-, current transformer 28 and electronics unit 29.

For the purposes of increased cooling the vertical heat dissipation channels 24 of the power supply and control module 20 are designed to make the vertical heat dissipation channels 24 extend when the power supply and control units are in a joined state.

In preferred embodiment a single power supply and control module 20 has the capacity to service a single or multiple lighting module(s).

Control unit 30 enables to transmit commands remotely to its connected control- and power supplies.

Drawings FIG. 4.1 and FIG. 4.2 demonstrate how lighting modules 10 may be joined with an interlock key 40. For joining the lighting modules 10, there are identical polygonal openings 19 on each side of the housing 12, which allow joining all the sides of the housings 12 of the light modules 10 with the aid of a specialized interlock key 40, that prevent over-tightening of the key for ensuring the constancy of the light source 13 centers when lighting modules 10 are grouped together.

FIG. 4.3 illustrates how multiple power supply and control modules 20 are grouped and form a power supply and control module unit that is controllable in a group by a manual control board 25 or remotely by control unit 30.

FIG. 5 demonstrates dome shaped accessory device 50 that fits camera lens and enables to capture the light of any desired environment and transmit the command to the lighting fixture to produce a light that is as close as possible to the light captured on the image. In addition to light collection the dome shaped diffusing accessory device 50 also allows recording the color of the surroundings environment with a camera of a mobile device. It allows recording and algorithmically analyzing the color of the environment or the desired light to reproduce the given color at a different location.

Drawing FIG. 6 demonstrates the lighting modules 10 in a group, which is mounted on an adjustable stand 60 that allows modifying the quantity of lighting modules 10 in height, width and tilt angle. It is possible to adjust the direction of lighting modules 10 by columns and rows with the aid of a washer located between the stand and the lighting modules. With the aid of a device with two to six degrees of freedom, the joined lighting modules 10 can be turned around the horizontal or vertical axis perpendicular to the direction of the light, whereas the columns may be turned around the horizontal or vertical axis also perpendicular to the direction of the light.

Drawing FIG. 6 demonstrates an embodiment where a desired number of lighting modules 10 are joined with the aid of the interlock key 40, which connects to all four sides of the lighting module 10 and ensures the constancy of the light source centers 13 throughout the system when lighting modules 10 are grouped together.

FIG. 7 is a schematic block diagram of a wireless light control system according to one possible embodiment of the present invention. The wireless control system consists of a single or a plurality of power supply and control units—hereinafter PSU (7-100*a, b, c*, etc., in FIG. 1-20), a light control device (7-200), a single or a plurality of lamps (7-300*a, b, c*, etc.), an attachable module (7-400), external spectrometer (7-500), virtual spectrometer calibration data (7-600) and an bifurcation 'OR' choice (7-700).

The PSU (7-100) consists of a power supply unit (7-101), upper contact pad (7-102), lower contact pad (7-103) and a dimmer unit (7-110). Dimmer unit (7-110) consists of a controller (7-111), a single or multiple per-channel constant current dimmers (7-112*a, b, c*, etc.) according to the number of lamps (7-300), a display (7-113), lamp voltage and current measurements (7-114), input keys (7-115) and a memory unit (7-116).

External light control device (7-200) contains a programmable control software (7-210). Lamps (7-300*a, b, c*, etc.) contain a memory unit (7-301), sensors (7-302) and an attachable feedback spectrometer (7-303).

A dimmer unit (7-110) can be connected via communications links with other PSUs (7-100*a, b, c*, etc.). An attachable transceiver module (7-400) enables communications between a single or multiple PSUs (7-100*a, b, c*, etc.) via various wired and wireless protocols with an external light control device (7-200).

A plurality of lamps (7-300*a, b, c*, etc.) may be connected to any of the PSUs (7-101*a, b, c*, etc.) through per-channel constant current dimmer (7-112*a, b, c*, etc.). An attachable transceiver module (7-400) can be connected to the PSUs (7-101*a, b, c*, etc.) through upper and lower contact pads (7-102 and 7-103). An external light control device (7-200) includes a programmable software (7-210) that communicates with the power and supply units (7-100 *a, b, c*, etc.) through an attachable transceiver module (7-400), which in turn communicates with an optional external spectrometer (7-500) and acquires virtual spectrometer calibration data (7-600) through wireless protocol.

FIG. 8 is a schematic block diagram of a controller (7-111) of wireless light control system shown in FIG. 7 according to one embodiment of the present invention, which includes a microcontroller unit software (8-100) that in turn includes algorithms (8-110) and a bootloader (8-120); and low-level peripheral handling (8-130). Algorithms (8-110) include general packet identification and routing (8-111), per-lamp calibration table control operations (8-112), saved state handling (8-113), dimmer unit identification sequence control (8-114), control of add-in modules (8-115), display control (8-116), fault identification and control (8-117), light timeline interpreter or the scripting language (8-118) and user input device control (8-119). Bootloader (8-120) includes remote main program update (8-121), lamp burn in test (8-122) and factory settings (8-123). Lower level peripheral handling (8-130) includes communication protocol with lamps (7-300), RS-485 protocol at DMX/RDM compatible settings (8-132), internal memory procedures (8-133), communications with DAC and ADC converters (8-134), control processor timers (8-135) and identification pins handling (8-136).

FIG. 9 is a schematic block diagram of a control software (7-210) for wireless light control system shown in FIG. 7 according to one embodiment of the present invention that includes touchscreen device software (9-100), which communicates with the PSUs (7-100*a, b, c*, etc.) through an attachable transceiver module (7-400). The external touchscreen light control device software includes virtual spectrometer feature (9-101), gray card ambient light detection feature (9-102), error management of hardware faults (9-103), touch-enabled color navigation on colorspace graph (9-104), detection of hardware (9-105), channel management (9-106), internet calibration database management (9-107), touchscreen user interface (9-108), fan control (9-109), user preferences management (9-110), scene save/load management (9-111) and light playlist (9-112).

FIG. 10 is a flow chart of control and calibration sub-features of the virtual spectrometer algorithm used throughout the system. The control part resides in the external light control device (7-200) according to one embodiment of the present invention, that is used for controlling the light units (7-300*a, b, c*, etc.) by using lower-level drivers (7-112*a, b, c*, etc). 'Virtual spectrometer' feature includes both calibration and control sub-features. Calibration sub-feature includes the following steps: Set input conditions (10-S1), acquire spectral power distribution graphs using spectrometer (10-S2), calculate (10-S3), output calibration maps (10-S4). Control sub-feature includes the following steps: request light on touchscreen (10-S5), poll stored maps and calculate (10-S6), set colors (10-S7), optional step: refine color using spectrometer (10-S8).

FIG. 11 is a diagram of a simplified example for the virtual spectrometer feature of the wireless light control system (FIG. 7) according to one embodiment of the present invention, which includes maps for spectra $W_1$ and $W_2$ and their according combinations of input parameters A and B.

FIG. 12 is a flow chart of the 'gray card ambient light detection' feature of the wireless light control system shown in FIG. 7 according to one embodiment of the present invention. The calibration sub-feature of said feature includes the following steps: acquire pictures of a standard gray card at predetermined temperature levels and camera ISO levels for this particular camera (12-S1) and save gray card averaged color table (12-S2). The control part of said feature includes the following steps: Take a picture of a scene using standard camera (12-S3), select area of the picture for analyzing (12-S4), calculate averaged color of selected area (12-S5), poll saved gray card color table (12-S6) and send color values to a light driver (12-S7).

DETAILED DESCRIPTION OF THE INVENTION

With reference to FIG. 2.1 where the printed circuit board that holds the active cooling device 11 and light sources 13 is placed with the spacer ring 9 and protective shield of the cooling radiator 8 into the housing 12 and is secured with screws. Light sources 13 are secured to the printed circuit board and printed circuit board is secured with the screws to the housing 12. The cable connection socket is located at the back of the housing 12. Light amplifier 14 is connected to the housing 12 with two magnet locks.

The part of the lighting module 10 that consists of active cooling device 11, housing 12 and light source 13 is compact and has the capacity to generate high power (P) light per volume (V), with efficiency (Ef) or the power in relation to volume is greater or equal to 100 kW/m³, where the mass (M) of the lighting module is greater or equal to 1 kg ((Ef=P/V≥100 kW/m³, where M≤1 kg). The calculation is based on the lighting module 10, which comprises of the active cooling device 11, housing 12 and light source 13.

The sides of the reflective spacer 15 are connected to the light amplifier 14 with a magnet connection and are attached to one another by corner screws, to which are in turn secured the fasteners of the diffuser along with the light diffuser 16.

Power Supply and Control Module

Drawings FIG. 3.1. to FIG. 3.4. illustrate how the current transformer 28 and cooling pipes of the power supply and control modules 20 are attached to the side 22*a* with screws. Between the side 22*a* and the current transformer 28 there is elastic insulation material that does not conduct electricity. Current switch and current input are attached to current transformer 28.

Side 22*b* is attached to electronics unit 29 with screws, to which in turn are attached the output sockets. Backing board, screen and control buttons are hermetically attached to the housing 21.

Control communication elements, the upper terminal pad 27*a* and lower contact pad 27*b* are hermetically attached to the housing 21.

The sides 22*a*, 22*b* and the housing are attached to one another by bolts and an electricity conducting liner is placed in between them.

All connections in the power supply and control module are hermetic.

In the preferred embodiment there is a possibility to join the power supply and control modules 20 into a modular power supply and control unit that is controllable as a group. Power supply and control modules 20 are joined to each other with fastening elements 26*a* and 26*b* that have inclined plane surface and are located on the same level in an opposite direction to one another. The ribs of the fastening heat dissipation channels 23 are compatible with the ribs of the power supply and control modules in a shift for allowing to fix the position of the power supply and control modules while keeping the function of the heat dissipation channels that are formed from the ribs. The heat dissipation channels 23 that are fastening the power supply and control modules 20 ensure the movement of airflow when the power supply and control modules are joined together by minimizing the contact surface.

It is possible to control the joined power supply and control modules 20 in a group. Power supply and control module 20 comprises of control communication elements—the upper terminal pad 27*a* and lower contact pad 27*b*-, current transformer 28 and electronics unit 29 for controlling the control- and power supplies individually or as a group when power supply and control modules are in a joined state.

Control communication elements 27*a*, 27*b* and 29 are automatically configurable based on the positioning of the devices in a manner that control commands are applied from the topmost control- and power supply module 20 or from the control unit 30.

Commands may be transmitted through the manual control board 25 or remotely through control unit 30, that attached to power supply and control module 20 with fastening elements 26*a* and 26*b* and enables to give commands to the power supply and control modules 20 remotely.

Single power supply and control module 20 or a group of multiple power supply and control modules 20 are connected to the main power supply and thereafter connected to a single or multiple lighting modules 10. This allows synchronized controlling of larger number of lighting modules without a cable connection and to control them from a single control center (computer).

The system for wireless calibration and control of the lighting device includes a general light control system that includes a power supply and control unit (FIG. 7-100*a* and in FIG. 1-20, FIG. 3.1-FIG. 3.4), connected to a plurality of single-spectral and multi-spectral lamps (FIG. 7-300*a, b, c*, etc.) with the main software residing in a controller (FIG. 7-111), an add-in attachable module (FIG. 7-400) that could be connected to a power supply and control unit (FIG. 7-100*a*) and an external light control device (FIG. 7-200) with the control software (FIG. 7-210).

The system incorporates a 'virtual spectrometer' calibration and control feature that allows full navigation in color space for portraying desired light using all the available multispectral light sources in the system through the use of precalibrated interpolable look-up bitmap tables, which are used to communicate light control commands to light source drivers (FIG. 7-112*a, b, c*, etc.).

The external light control device (FIG. 7-200) incorporates a software 'gray card ambient light detection' feature which allows ambient light replication using a standard embedded photo/video camera, a standard gray or a white card, using a multi-spectral light source; all available power supply and control units (FIG. 7-100*a, b, c*, etc.) can be connected together using contact pads (FIG. 7-102, 103) to form a 'stack' with a bus communications line in a single 'stack', with communications between different 'stacks' performed using attachable modules capable of translating internal stack bus signaling protocol to a different wired or wireless protocol (FIG. 7-400) for the use with external light control device(s).

Said attachable modules (FIG. 7-400) that communicate with external light control device(s) can use a different protocol from the one used by the primary communications link between the power supply and control units.

Using an external light control device, the controller software (FIG. 7-111) can be upgraded through the use of remote software upgrade module (FIG. 8-121) in all PSUs in a 'stack', and in multiple 'stacks'.

A dimmer unit (7-110) that includes a controller (7-111), a single or multiple per-channel constant current dimmers (7-112 *a, b, c*, etc.), a display (7-113), lamp voltage and current measurements (7-114), input keys (7-115) and a memory unit (7-116) is located inside a PSU (7-100*a, b, c*, etc.) along with power supply unit (7-101) and upper and lower contact pads (7-102, 7-103). A dimmer unit (7-110) can be connected with other PSUs (7-100*a, b, c*) via communications links.

Multiple PSUs (7-100*a, b, c*, etc.) may be stacked by using upper contact pads (7-102) and lower contact pads (7-103), enabling RS-485 (8-132) communications on a bus between all the PSUs in a 'stack'.

An attachable transceiver module (7-400) enables communications between a single or multiple PSUs (7-100*a*, 100*b*, 100*c*, etc.) via various wired and wireless protocols with an external light control device (7-200). An attachable transceiver module (7-400) can be connected to the PSUs through upper and lower contact pads (7-102 and 7-103).

The contact pads (7-102 and 7-103) may also be used to connect an attachable module (7-400) typically with transceiver functionality for increased flexibility through "OR" bifurcation.

External light control device (7-200) contains a programmable control software (7-210) that consists of touchscreen device software (9-100) for communication with the PSUs (7-100*a, b, c*, etc.). The external (e.g. touchscreen) light control device software includes virtual spectrometer feature (9-101), gray card ambient light detection feature (9-102), error management of hardware faults (9-105), touch-enabled color navigation on colorspace graph (9-104), detection of hardware (9-103), channel management (9-106), Internet calibration database management (9-107), touchscreen user interface (9-108), fan control (9-109), user preferences management (9-110), scene save/load management (9-111) and light playlist (9-112).

Lamps (7-300*a, b, c*, etc.) contain a memory unit (7-301) for reading and writing spectrum calibration information; sensors (7-302) for measuring vital parameters, such as for example temperature of the lamp enclosure or fan speed in case the lamp module is equipped with a fan; and an attachable feedback spectrometer (7-303) which allows to measure a portion of the light coming from the multi-spectral lamp module.

A plurality of lamps (7-300*a, b, c*, etc.) may be connected to any of the PSUs (7-100*a, b, c*, etc.) through per-channel constant current dimmers (7-112*a, b, c*).

A controller (7-111) of wireless light control system shown in FIG. 7 includes a microcontroller unit software (8-100) that in turn includes algorithms (8-110) and a bootloader (8-120); and low-level peripheral handling (8-130). Algorithms (8-110) include general packet identification and routing (8-111), per-lamp calibration table control operations (8-112), saved state handling (8-113), dimmer unit identification sequence control (8-114), control of add-in modules (8-115), display control (8-116), fault identification and control (8-117), light timeline interpreter or the scripting language (8-118) and user input device control (8-119). Bootloader (8-120) includes remote main program update (8-121), lamp burn in test (8-122) and factory settings (8-123). Lower level peripheral handling (8-130) includes communication protocol with lamps (7-300*a, b, c*, etc.), RS-485 protocol at DMX/RDM compatible settings (8-132), internal memory procedures (8-133), communications with DAC and ADC converters (8-134), control processor timers (8-135) and identification pins handling (8-136).

The control sub-features of the virtual spectrometer algorithm used throughout the system reside in the external light control device (7-200) according to one embodiment of the present invention, that is used for controlling the light units (7-300*a, b, c*, etc.) by using lower-level drivers (7-112*a, b, c*, etc)

Calibration method of the virtual spectrometer (FIG. 10) allows calculating (10-S3) interpolable look-up maps (10-S4) for the digital control commands of the multi-spectral light source, based on 'input parameters' (i.e. controllable or ambient variables) (10-S1), that allow setting a multitude of colors the light sources used in the system are capable of emitting.

A calibration subfeature ("A") with pre-defined input parameters (FIG. 10-S1) where spectral power distributions are acquired (FIG. 10-S2) are used in a calculation (FIG. 10-S3) which outputs color calibration tables (FIG. 10-S4).

The calibration subfeature ("A") allows mapping (FIG. 10-S3) color space bitmap look-up tables of control values based on the multi-spectral light source output for each specified combination of 'input parameter' node values.

1. with an 'input parameter' corresponding to a controllable or an ambient variable;
2. with a bitmap look-up table enclosing the entire color space area the multi-spectral light source is capable of covering; and each pixel of said bitmap look-up table enclosing a smaller area of said color space;
3. the subfeature includes (in FIG. 10-S3) an ability of setting a plurality of precision levels for different areas of interest in a color space;
4. the subfeature includes (in FIG. 10-S3) a smoothing algorithm to smooth out bitmap look-up tables before outputting them (in FIG. 10-S4);
5. the subfeature includes, in (FIG. 10-S3), an automatic alpha mask generation for the bitmap tables to be output in (FIG. 10-S4);
6. the output maps (FIG. 10-S4) can be made available over the internet (FIG. 7-600) for updating calibration tables in situ, where the internet database contains calibration tables for matching to a lamp serial number digitally acquired from lamp memory (FIG. 7-301);

A control subfeature ("B") that allows requesting light (FIG. 10-S5), polling stored color calibration tables and calculating (FIG. 10-S6), and setting colors (FIG. 10-S7).

The control subfeature ("B") allows portraying different colors by selecting different points in a color space (in FIG. 10-S5), utilizing saved pre-mapped (in FIG. 10-S4) bitmap look-up tables' light control command values, automatically adjusting for temporal variations in 'input parameters' with interpolation using known interpolation curves between said tables (in FIG. 10-S6), and outputting (in FIG. 10-S7) the final light control command values to a light source driver.

The subfeature "B" allows, in step 10-S5, to use either an attachable spectrometer (FIG. 7-500) or a 'gray card ambient light detection' feature to place an initial marker on the closest colorspace point to be replicated using lamps (FIG. 7-300*a, b, c*, etc.)

The optional external spectrometer refining subfeature ("C") (FIG. 10-S8) allows for the negative feedback control using an attachable spectrometer module (FIG. 7-303) that measures periodically a portion of the light coming from the lamp modules, to further refine the 'virtual spectrometer' mapping subfeature "A".

The subfeature "C" includes means to define the size of an area around the selected color space point (in FIG. 10-S5) and adjust the multi-spectral light output to keep the actual measured color space point (using FIG. 7-303 in FIG. 10-S8) from drifting outside said area.

A 'gray card ambient light detection' feature, which is part of the external light control device (FIG. 7-200) includes a standard (embedded) color video/photo camera of said external light control device (FIG. 7-200), a calibrated multi-spectral light source capable of emitting light of different color temperatures (FIG. 7-300*a, b, c*, etc.) and a standard gray or white card normally used during an image capture process.

The feature allows creation of gray or white card calibration tables for different color temperature levels by using a calibrated multi-spectral light source capable of emitting light of different color temperatures, pointing a standard color video/photo camera at a gray or white card, making a picture or a series of pictures for different color temperatures set using said light source, analyzing said picture(s) and saving a table to a local or internet location.

The feature allows the end-user to use said standard video/photo camera to make a picture or a series of pictures of a scene, and polling pre-calibrated tables to detect the closest color temperature of a scene to a pre-calibrated one.

The 'gray card ambient light detection' feature includes the following steps: acquire pictures of a standard gray card at predetermined temperature levels and camera ISO levels for this particular camera (12-S1) and save gray card averaged color table (12-S2). The control part of said feature includes the following steps: Take a picture of a scene using standard camera (12-S3), select area of the picture for analyzing (12-S4), calculate averaged color of selected area (12-S5), poll saved gray card color table (12-S6) and send color values to a light driver (12-S7).

DESCRIPTION OF THE PREFERRED EMBODIMENT

Power supply and control module 20 is wired to lighting module 10, through which the power and commands are transmitted from the power supply and control module 20 to the lighting module 10.

In the preferred embodiment a single power supply and control module designed to service up to three lighting modules 10. For the purposes of servicing larger number of lighting modules 10 the necessary number of power supply and control modules 20 are joined with fastening elements 26a and 26b.

Grouped power supply and control modules 20 are operating in a way where a single or multiple lower control- and power supplies resignate the control function to the topmost power supply and control module 20. The control commands are transmitted through a manual control board 25, which transmits commands to the electronics unit 29. In case of remote controlling the control unit 30 attached to the-topmost leading power supply and control module which takes over the control from the manual control board 25.

Power supply and control module 20 is connected to the power network and the current transformer 28 located therein transforms the current into direct current for the electronics unit 29. Current transformer 28 is designed to operate in a manner where filters are added to its pulse width modulation for minimizing the flickering, which is needed due to lighting requirements of the moving image capturing.

Lighting modules 10 are joined with the aid of an interlock key 40 in a desired configuration. All four sides of the lighting module 10 are compatible with the interlock key 40.

The light amplifier 14 directs and amplifies the light generated by the light sources 13 creating general lighting. The light diffuser 16 diffuses the shadows of the general lighting in a manner that the resulting light is cast without the sharp edges.

The modification of parameters is performed through a manual control board 25 by using respective software and the feedback is communicated to the monitor. Commands and supply voltages are transmitted through a plug connector to the lighting module 10, which in turn communicates the electronic feedback to the monitor of the manual control board 25.

The heat generated from the light sources 13 is transferring to the housing acting as a passive cooling device 12, to which according to necessity an active cooler 11 is added.

The monitoring of the active cooling is conducted by the electronics unit 29 and measurement of the core temperature is effected through the sensors that are placed into the lighting module 10.

Adjustment of the lighting module 10 parameters and monitoring of the active cooling levels are controlled through the electronics unit 29 located inside the power supply and control module with the aid of respective software.

Device may be used for example with the lighting power of the order of 400 W, with the luminous flux of the frontal output plane over 0.5 Mlm/m$^2$ (megalumens per square meter of said plane).

Single power supply and control module 20 may be used for example with the lighting power in order of magnitude of 360 W up to 600 W, which corresponds to three lighting modules 10.

Lighting modules 10 may be used with the luminous flux of the frontal output plane of the lighting module 10 in the range of 0.5 Mlm/m$^2$ to 2.0 Mlm/m$^2$.

By using the formula where Ef=L×P where L is the luminous flux (lm), t is the lifespan (hours, h), P is the power of the lighting source or lamp (W) and Ef is calculated efficiency (lm h/W), or lumen-hours per 1 W (hours are convertible to seconds) can be calculated, how much the lighting fixture is capable of emitting during its lifespan. By the end of the lifespan the lighting fixture becomes unusable: it either burns out or achieves average lighting power under 50% or its temperature shifts significantly from the necessary levels. As opposed to HMI-s and incandescent lamps the LED's allow, calibration when the lighting power decreases to levels below 50%.

Refer to FIG. 7, which is a block diagram of the preferred embodiment of the system, the general components, which are universal to all embodiments, are: a power supply and control unit (PSU) (7-100a, b, c, etc.) with a programmable controller (FIG. 7-111; the software depicted in FIG. 8), a plurality of lamps (FIG. 7-300a, b, c, etc.) that can be connected to any PSU, an attachable transceiver module (FIG. 7-400) compatible with PSUs, an external light control device (FIG. 7-200) with programmable software (FIG. 7-210; also FIG. 9) that communicates with PSUs by using an attachable transceiver module (FIG. 7-400). Furthermore, all the embodiments include means of interconnecting PSUs utilizing a bus protocol. In addition to that, all the embodiments include general implementations of the multi-spectral look-up table mapping and control 'virtual spectrometer' algorithm (FIG. 10) and the standard embedded video/photo camera 'gray card ambient light detection' (FIG. 12) algorithms.

As has been shown on FIG. 7, the external light control device (FIG. 7-200) has an ability to communicate with the attachable module (7-400) which in turn communicates with the PSU controller (FIG. 7-111), and visa-versa. The 'stack' communication in the present invention allows for connecting multiple PSUs (FIG. 7-100a, b, c, etc.) in a 'stack' which effectively lengthens the communications bus. In all embodiments, the external light control device has an ability of communicating with multiple 'stacks' with the logic of communicating contained in the external light control device (FIG. 7-200; preferred embodiment FIG. 9-105) and the attachable modules (FIG. 7-400).

For example, in one embodiment, a plurality of 'stacks' with one attachable module (FIG. -400) per such 'stack', that act as Wi-Fi (IEEE 802.11) clients, can connect to a single wireless router, which in turn communicates with an Apple iOS or Android-enabled external light control device using specialized software.

In another embodiment, a plurality of 'stacks' are joined together using an attachable module (FIG. 7-400) supporting wired and wireless Digital MultipleX (DMX-512) protocol, which are controlled using a DMX console external light device with specialized software. In these two exemplary embodiments, and all other embodiments, the modularity of software communications implementation allows to spatially separate multiple 'stacks' of PSUs, and use different wired and wireless communications protocols, thereby supporting large-scale studio or set operations.

In the preferred embodiment, the light control system consists of one or more power supply and control units, or PSUs, (7-100*a*, *b*, *c*, etc.), with the possibility of connecting multiple such units in a 'stack' by using upper (FIG. 7-102) and lower contact pads (FIG. 7-103), enabling RS-485 (8-132) communications on a bus between all the PSUs in a 'stack', also enabling near-simultaneous packet exchange, since a color control packet is processed when the last byte of this packet is received by all the PSU controllers on the bus in a 'stack' with the timing precision of the controller processor communications interrupt (Color command control packets are sent out either from the topmost PSU or via an attachable module. Such a bifurcation occurs in FIG. 7-700). Furthermore, ID pins are used to signal additional identification information (8-136) to identify the location of PSUs in a 'stack'. In some embodiments, said contact pads (7-102 and 7-103) are replaced by wireless connections. In some embodiments, RS-485 communications bus protocol in a 'stack' is replaced by Ethernet communications.

Each PSU contains, in the preferred embodiment, one or more dimmers (7-112*a*, *b*, *c*, etc.). In the preferred embodiment, a per-channel constant current dimmer is used as a driver for lamp modules (FIG. 7-300*a*, *b*, *c*, etc., and dimmer handler FIG. 8-134) utilizing a plurality of light-emitting diodes of one or multiple spectra. The controller (7-111) communicates with the lamp modules (7-300) using a communications protocol (8-131). The controller communicates with lamp modules' memories (FIG. 7-301) to read and write spectrum calibration information. The lamp modules' sensors (7-302) can be used to measure vital parameters, including, but not limited to, temperature of the lamp enclosure and fan speed (if the lamp module is equipped with a fan). The controller (7-111) checks whether these vital parameters are within specified ranges for these parameters and sends an error packet to all the interconnected devices in a 'stack' with according parameter information using the fault identification and control algorithms (8-117). Since light consistency is of vital importance, in the preferred embodiment, the per-channel constant current dimmer (7-112*a*, *b*, *c*, etc.) utilizing Digital-Analog Converters (DACs) are calibrated in factory to allow the 'virtual spectrometer' color consistency of Light Emitting Diodes (LEDs) in the intensity range of 0.5% through 100% on linear scale; the calibration is accounted for in FIG. 8-134, and stored in FIG. 7-116.

The light parameters, including, but not limited to, intensity, brightness, tint, temperature or a color coordinate in color space, are requested either using the built-in user input-output means on the topmost PSU in a stack (FIG. 7-113, 115; FIG. 8-116, 119) or by using an external light control device (FIG. 7-200) software feature (FIG. 7-210), with both means available through bifurcation at (7-700).

In one embodiment, an attachable feedback spectrometer (7-303) is used to measure a portion of the light coming from the multi-spectral lamp module (FIG. 7-300), which is interpreted by the controller (FIG. 7-111; FIG. 8-112) as a color coordinate in a color space (e.g. CIE-1931). The requested type of light can be then refined by the controller (FIG. 7-111) or an external light control device (FIG. 7-200) software (FIG. 7-210) using this color space information.

In the preferred embodiment, the firmware of the primary controller (FIG. 7-111) initiates a PSU identification sequence (FIG. 8-111, 114), upon which the lamp voltage and current measurement unit (FIG. 7-114) of each of the PSUs is used by the controller (FIG. 7-111) to identify its location in a 'stack' and perform a packet exchange between the power supply and control units. The topmost PSU (as an example in case of 3 PSUs depicted on FIG. 7, it would be FIG. 7-100 (*a*, *b*, *c*, jne)) collects addresses from all the units down the 'stack'. When all the PSUs have been identified and their respective addresses have been collected, the 'stack' enters a 'steady state' where current and voltage are measured periodically by a controller (FIG. 7-111) using the lamp voltage and current measurement module (FIG. 7-114) that enables hot-swap (connecting and disconnecting during operation) of the PSUs.

The contact pads of a PSU (FIG. 7-102, 103), in addition to attaching another PSUs, can be used (FIG. 7-700) to connect an attachable module (FIG. 7-400), typically with transceiver functionality. Flexibility is gained by the way of using a communications protocol for communicating with an external light control device (FIG. 7-200) using a different low-level protocol from the one used by the primary communications link between PSUs in a 'stack'. In the preferred embodiment, one type of the module contains a wireless transceiver utilizing a wireless ('Wi-Fi') protocol with IEEE 802.11 technology, for the use with an external light control device (FIG. 7-200) supporting said Wi-Fi protocol. Also, in the preferred embodiment, the primary communications link between PSUs in a 'stack' uses the settings compatible with the Digital MultipleX (DMX-512) protocol, however when DMX is not in use, proprietary bi-directional packets are used on the same bus for PSU identification, color control commands and other information.

Another type of module can act as a wired or wireless DMX transceiver, and a Remote Device Management (RDM) transceiver. Effectively, any type of transceiver can be used which converts the desired protocol to the protocol used in the interconnected 'stack' of PSUs.

FIG. 9 is a sub-diagram of the external light control device software (7-210). The external light control device software, in the preferred embodiment, utilizes Apple iOS or Android platform with touchscreen functionality (9-108). In some embodiments, the external light control device software (7-210) utilizes Microsoft Windows or Apple Mac operating system. In yet other embodiments, the external light control device (FIG. 7-200) is a generic DMX console, with the use of a DMX receiver attachable module (FIG. 7-400).

In the preferred embodiment, using an external light control device (7-210), the controller software (FIG. 7-111) can be upgraded through the use of remote software upgrade module (FIG. 8-121) in all PSUs (7-100*a*, *b*, *c*, etc.) in a 'stack', and in multiple 'stacks'.

In the preferred embodiment, the touchscreen-enabled external light control device software uses a 'virtual spectrometer' feature (FIG. 9-101; FIG. 10) for controlling (9-104) multi-spectral light using calibrated interpolable look-up tables ('maps') with the tables for different batches of lamps contained in an internet database (7-600) which are typically stored (cached) locally using internet calibration database management (9-107). This 'virtual spectrometer' feature can be used either separately or with the 'gray card ambient light detection' feature (9-102) which enables measurement of the ambient light temperature using a standard embedded video and/or photo camera of the external light control device, with or without the use of specialized spectrometer equipment such as an external spectrometer (7-500), allowing for reproduction of ambient light using a PSU dimmer (7-112a, b, c, etc.) and lamp units (7-300a, b, c, etc.). In another embodiment, the size of the lamp memory (7-301) allows for storing 'virtual spectrometer' calibration information in each lamp.

Furthermore, the feature of the external light control device (FIG. 7-210; FIG. 9), in the preferred embodiment, allows detection (9-105) and assignment of light control command value channels on per-lamp, per-PSU and/or per-'stack' basis, with channel controls available for each of these levels (9-106), and which can be stored as separate scenes (9-111). In some embodiments, additional levels of control based on physical distribution of light sources are available, including, but not limited to, multi-lamp panelled frames and multi-lamp soft light enclosures.

Furthermore, the channel management algorithm (9-106) allows for bi-directional synchronization of light control command values between the external light control device (FIG. 7-200) and the PSU controller (7-111), thereby enabling control and managing of light commands both remotely and in situ. Light setups with channels and according light control command values are accessible as a local and/or internet scene save/load management feature (FIG. 9-111). Furthermore, the faults detected by the PSU controller (FIG. 7-111, FIG. 8-117) and the according controls are accessible in the external light control device (FIG. 9-103, also FIG. 9-109).

In some embodiments, a light playlist (9-112) can be used on the external light control device, and the light timeline interpreter in the form of a simple scripting language (8-112), which allows playback of timelines composed using an external light control device, which is then uploaded to controller memory (7-116) using the primary RS-485 communications link in a 'stack' and then played back using a faster communications link such as the Serial Peripheral Interface Bus (SPI) which controls lamp per-channel constant current dimmers (FIG. 7-112a, b, c, etc.)

The 'virtual spectrometer' feature, which can be used by an external light control device (7-200) or, in some embodiments, the PSU controller (7-111), to control the light of the lamp units (7-300a, b, c, etc.), using power supply and control units (7-100a, b, c, etc.) as lower-level drivers, is described herein.

Any separately dimmable multi-spectral light source (with 'light source' referring to a complete lighting unit that outputs all the desired spectra, i.e. an enclosure or a plurality of enclosures of some form with multiple light emitters having multiple spectra), such as a solid-state lighting diode, an array or multiple arrays of diodes, with each diode having single or multiple dies, where each die can have a unique light output spectrum; such light source is capable of producing any color value within a specific region of a color space innate to this light source. In this description, CIE-1931 color space is used as an example, however the invention wholly applies to any universal color space, such as the most recent (as of this writing) CIECAM02 color appearance model.

It is possible to calculate, based on 'input parameters' (i.e. controllable or ambient variables), interpolable look-up maps for the digital control commands of the multi-spectral light source, that allow setting a multitude of colors the light source is capable of emitting. This number of colors is limited by calculation and interpolation precision (computational resources), and the precision of the light control commands, for example, the precision of the Digital-Analog Converter (DAC) of the Light Emitting Diode (LED) driver. The precision of the calculation algorithm has been found to allow creation of look-up tables with precision better than $|\Delta UV|<0.00100$, and $|\Delta UV|<0.00075$ when using a self-regulating spectrometry system with negative feedback to refine light source calibration. In the latter case, color space navigation precision depends heavily on the precision of the spectrometer. In all cases, the wavelength resolution of the spectrometer should be at least 5 nm in the full visible range, and at least a 10-bit intensity scale. The full scale of the light control command driver for intensity (e.g. DAC) used in calibration and control should be at least 16-bit, with the constraint that the control resolution scale should be as good or better than the calibration resolution scale.

Refer to FIG. 10, in step S1, the input parameter set $P=(P_1; P_2; \ldots; P_N)$ is defined, where each parameter has a number of interpolation points greater than zero. For $P_1$, there are $k_1$ interpolation points, for $P_2$, there are $k_2$ points; and, for $P_1$, there are $k_1$ points. For example, there could be $k_1=4$ light source intensity settings (e.g. 0%; 1%; 25%; 100%) and $k_2=2$ LED enclosure temperature settings (e.g. 233 K and 363 K) for a total of 4*2=8 combinations of interpolation points. When using a precisely known smooth interpolation function, only two interpolation points (or 'nodes') would suffice: one would be the start and the other would be the end point (e.g. when the intensity of a LED versus enclosure temperature has been measured for the full scale of operating temperatures).

Let each combination of input parameters be $C_j$. The total number of such combinations would then be $C_{NUM}=k_0*k_1* \ldots *k_N$.

In FIG. 10-S2, for each combination of input parameters $C_1$, a Spectral Power Distribution graph (SPD) is acquired using a spectrometer for each spectral channel the light source is capable of emitting. It should be noted that the spectral components of the light source do not have to be of a single technology; different types of visible light emitters can be intermixed into a single light source, including, but not limited to, for example, solid state lighting, plasma and incandescent lighting, with the only constraint that the driver of the light control system should allow separate dimming of all spectral channels.

In FIG. 10-S3, input SPDs are processed to get color values in the color space of choice (e.g., CIE-1931 or CIECAM02). These color values cover the entire gamut of colors the light source is capable of emitting, with homogeneous or heterogeneous covering up to the best precision possible; these calibration value arrays are referred herein as 'maps'. Additionally, these maps can be calculated with a variable resolution AR for fine and coarse areas, defined as bounded areas in color space. These fine and coarse areas, which are managed by the calculation kernel, are useful in case calculation time needs to be optimized if periodic recalibrations of the resulting maps should be done, or when more precision is needed in key color space area(s). For instance, if the light source is to be used mostly for portraying white light, then it would be useful to apply the finest resolution to the black body locus area, and to arrive at the maximum allowed computational time.

Effectively, instead of a time-consuming task of setting the multitude of color command value combinations directly and acquiring a color space coordinate (for example, CIE-1931 $(x_0; y_0)$) for each and every combination of input parameters and control values, only interpolation points are measured and subtle changes in all key parameters are interpolated and are saved, in FIG. 10-S4, as a series of maps to be used by a touch-screen enabled device.

In FIG. 10-S5, when a color is requested using a light control command in a touch-screen enabled device, the input parameters are taken into account, such as desired color coordinate ($x_0$; $y_0$), and other parameters such as light intensity, the ambient and temperature of light source, etc. Using this information, in FIG. 10-S6, the stored calibration maps (corresponding to parameter combinations saved in FIG. 10-S4) are polled and interpolated using stored interpolation functions for each input parameter. For instance, given intensity settings of 25% and 35%, light control command values 1337 and 1918 are acquired from stored maps for the color space coordinate ($x_0$; $y_0$), and a setting for 30% is desired. With a perfectly linear function, the interpolated result would be 1627.5.

In FIG. 10-S7, the colors are sent to the light source system using control functions; in the case of solid-state lighting, the DACs corresponding to spectral channels are set to calculated values.

In FIG. 10-S8, an optional self-regulating system with negative feedback utilizing a spectrometer can be attached to the light source that acquires emitted light from the desired light source (7-303), with stray light (undesirable background light) of no more than 1% that of the light gathered from the desired light source, and sends color coordinates periodically to a touchscreen enabled device, which are then used by the present algorithm to further refine the desired color for increased precision.

As a simplified example of the aforementioned 'virtual spectrometer' feature used by an external light control device (FIG. 7-200; FIG. 9-101; control feature FIG. 9-S5 through S8), FIG. 11 demonstrates the 'virtual spectrometer' concept with 2 spectra ($W_1$ and $W_2$), an input color coordinate ($x_0$; $y_0$) and 1 input parameter on which the spectrum depends (here, it is the light intensity as a dimensionless unit with a value range of 0 to 1) with nodes at values 0 (all colors at zero level), 0.01, 0.25, 0.5 and 1.0 (all colors at full intensity). Here, these light intensity values are used to most closely match the non-linear light sensitivity of human eye.

The following parameters: the desired color coordinate ($x_0$; $y_0$) and the intensity parameter $I_{set}$=0.75 are input using the touchscreen interface in the external light control device (FIG. 7-200; FIG. 9-101, 108).

For this intensity value $I_{set}$=0.75, the color calibration maps at nodes $I_{start}$=0.5 and $I_{end}$=1.0 are used with known interpolation functions for this range and spectra $W_1$ and $W_2$.

For spectrum $W_1$ and intensity level $I_{start}$=0.5, a command value for coordinate ($x_0$; $y_0$) is obtained: f($x_0$; $y_0$)=$W_1$A=0.7813.

Similarly, for spectrum $W_2$ and intensity level $I_{start}$=0.5, a command value for coordinate ($x_0$; $y_0$) is obtained: f($x_0$; $y_0$)=$W_2$A=0.9109.

For spectrum $W_1$ and intensity level $I_{end}$=1.0, a command value for coordinate ($x_0$; $y_0$) is obtained: f($x_0$; $y_0$)=$W_1$B=0.7089.

For spectrum $W_2$ and intensity level $I_{end}$=1.0, a command value for coordinate ($x_0$; $y_0$) is obtained: f($x_0$; $y_0$)=$W_2$B=0.4331.

Using an interpolation function $p_1$(x; y) for spectrum $W_1$ with command values $W_1$A and $W_2$A as nodes for $I_{start}$=0.5 and $I_{end}$=1.0, and the desired intensity input value $I_{set}$=0.75, the final command value for spectrum $W_1$ is obtained as $C_1$=0.7685.

Similarly, using an interpolation function $p_2$(x; y) for spectrum $W_2$ with command values $W_1$B and $W_2$B as nodes for $I_{start}$=0.5 ja $I_{end}$=1.0 and the desired intensity input value $I_{set}$=0.75, the final command value for spectrum $W_2$ is obtained as $C_2$=0.7790.

These light control command values $C_1$ and $C_2$ are then composed in a packet and sent out from the light control device (7-200) to all the 'stacks' using a communications link between the external light control device (7-200), and an attachable module (7-400), which then forwards the packet to all the PSUs in a 'stack' using an RS-485 bus. The packet is read by the PSU controller (7-111), which then sends out the packet to desired lamps (7-300a, b, c, etc.) over the communications link with the lamps (8-131) using the lamps' respective calibrated per-channel constant current dimmers (FIG. 7-112a, b, c, etc.). The voltages and currents of the light sources in the lamps are then immediately read out using the lamp voltage and current measurements unit (FIG. 7-114) and compared with stored (7-116) currents and voltages typical for these command values $C_1$ and $C_2$, in order to detect any lamp faults.

The invention claimed is:
1. A lighting device for image capturing, comprising:
   a lighting module that includes an active cooling device, a housing, at least one light source, a light amplifier, a reflective spacer, a light diffuser;
   a power supply and a control module that includes a housing and sides, each of the housing and the sides of the control module having cooling channels, a manual control board, fastening elements, control communication elements, current transformer, an electronics unit;
   a control unit;
      an interior of the housing having a curved element roughly derived from rotating a parabolic cross-section, wherein the curved element is located under the active cooling device and improves the efficiency of the active cooling by directing the cooling stream back under an angle, further wherein said curved element acts as a passive cooler;
      the cooling channels configured to hinder the passage of warm airflow between the lighting modules that are joined with each other horizontally and vertically and when grouped diagonally the passage of warm airflow from diagonally connected lighting module is with maximum resistance due to the length of the cooling channels and upward direction of the airflow, which increases the efficiency of reverse air flows;
   the lighting module being applied in a manner that when one or more of the lighting module is grouped together the distance of the light sources of the lighting modules remains constant;
   the lighting module further including diffusers that control the light angle in conjunction with the light amplifier and the reflective spacers that generate a homogeneous glowing surface instead of individually radiating diodes;
   when the power supply and control modules are grouped together, the vertical heat dissipation channels of the housing, acting as a passive cooling device of the power supply and control module is formed a cooling tower which increases cooling by acceleration of air flow;
   the power supply and control modules are fastened together by heat dissipation channels to increase the airflow by minimizing the contact surface of the grouped power supply and control modules as the contact is limited to central ribs of the housing, maximizing the available cooling surface area;
   the power supply and control module further including an upper terminal pad and a lower contact pad, the control communication elements configured to control the power supply and control modules individually or as a group when the power supply and control modules are joined together;

the control communication elements are automatically configurable based on the positioning of the devices in a manner that control commands are applied from the topmost power supply and control module or from the control unit;

the control unit is implemented within the unified compact solution with the power supply and control module for controlling its joined power supply and control modules remotely.

2. The lighting device of claim 1, wherein each side of the housing of the lighting module comprises identical polygonal openings for joining all the sides of the housing with the interlock key that prevent over-tightening of the key for ensuring the constancy of the light source centers when lighting modules are grouped together.

3. The lighting device of claim 1, further comprising a dome shaped accessory device placed on the camera lens to form a light of any filming location as an image for recording of the natural color.

4. The lighting device of claim 2, which characterized in that lighting modules in a grouped state are fixed to an adjustable stand, which enables to modify the quantity of lighting modules in height, width and tilt angle, and includes a device with two to six degrees of freedom, which allows turning the joined lighting modules around the horizontal or vertical axis perpendicular to the direction of the light, whereas the columns may be turned around the horizontal or vertical axis also perpendicular to the direction of the light.

5. A system for wireless calibration and control of a lighting device, comprising:
- a general light control system that includes a power supply and a control unit connected to a plurality of single-spectral and multi-spectral lamps with the main software residing in a controller;
- an add-in module connected to the power supply and the control unit;
- an external light control device with a control software that is configured to;
- allow the light control system to incorporate a calibration and control feature that calibrates interpolable look-up bitmap tables, which are used to communicate light control commands to light source drivers, and allow a user to fully navigate in a color space for portraying desired light using all available multispectral light sources in the light control system;
- allow the external light control device to incorporate a software feature which replicates ambient light using a multi-spectral light source and calibration information acquired using a standard embedded photo/video camera pointed at a gray card or a white card;
- connect all available power supply and control units together using contact pads to form a plurality of stacks, wherein each of said plurality of stacks comprises a bus communications line, further wherein said plurality of stacks communicates via the add-in module that is capable of translating internal stack bus signaling protocol to a different wired or wireless protocol for the use with the external light control device and communicate with external light control devices to use a different protocol from the one used by the primary communications link between the power supply; and
- upgrade through the use of remote software upgrade module in all PSUs in one or more of the plurality of stacks.

6. The system of claim 5, wherein the calibration and control feature comprises:
- a calibration subfeature with pre-defined input parameters, which acquires spectral power distributions that are used in a calculation and outputs color calibration tables;
- a control subfeature that allows the user to request light, poll stored color calibration tables, and calculate and set colors;
- an external spectrometer refining subfeature;
- the calibration subfeature configured to;
- map color space bitmap look-up tables of control values based on the multi-spectral light source output for each specified combination of input parameter values, wherein the input parameter corresponds to a controllable or an ambient variable and the color space bitmap look-up tables include the entire color space area the multi-spectral light source is capable of covering, and each pixel of the bitmap look-up tables includes a smaller area of the entire color space area;
- set a plurality of calculation precision levels for different areas of interest in the color space;
- smooth out the color space bitmap look-up tables before outputting them;
- generate an automatic alpha mask for the color space bitmap tables to be output, wherein the color space bitmap tables, upon output,
- are made available over the internet for updating calibration tables in situ, where at least one database on the internet contains calibration tables for matching to a lamp serial number digitally acquired from lamp memory;
- the control subfeature configured to;
- portray different colors after the user selects points in the color space, utilizing saved pre-mapped bitmap look-up tables' light control command values, automatically adjusting for temporal variations in the input parameters with interpolation using known interpolation curves between said tables, and outputting the final light control command values to a light source driver;
- use the output of either an attachable spectrometer or a gray card ambient light detection feature to place an initial marker on the closest color space point to be replicated using lamps;
- the external spectrometer refining subfeature configured to;
- contain a negative feedback control using an attachable spectrometer module that measures periodically a portion of the light coming from the lamp modules, to further refine a virtual spectrometer mapping subfeature;
- define the size of an area around the selected color space point; and
- use negative feedback on the multi-spectral light output and keep the actual measured color space point from drifting outside of the defined area.

* * * * *